US012289417B2

(12) United States Patent
Beekman et al.

(10) Patent No.: US 12,289,417 B2
(45) Date of Patent: Apr. 29, 2025

(54) ESTABLISHING PROVENANCE OF APPLICATIONS IN AN OFFLINE ENVIRONMENT

(71) Applicant: Fortanix, Inc., Mountain View, CA (US)

(72) Inventors: Jethro Gideon Beekman, Eindhoven (NL); Raoul Strackx, Leuven (BE)

(73) Assignee: Fortanix, Inc., Santa Clara, CA (US)

( * ) Notice: Subject to any disclaimer, the term of this patent is extended or adjusted under 35 U.S.C. 154(b) by 239 days.

(21) Appl. No.: 17/168,096

(22) Filed: Feb. 4, 2021

(65) Prior Publication Data
US 2022/0247576 A1 Aug. 4, 2022

(51) Int. Cl.
H04L 29/06 (2006.01)
H04L 9/14 (2006.01)
H04L 9/32 (2006.01)

(52) U.S. Cl.
CPC .............. H04L 9/3263 (2013.01); H04L 9/14 (2013.01); H04L 9/3247 (2013.01)

(58) Field of Classification Search
CPC ....... H04L 9/3263; H04L 9/14; H04L 9/3247; H04L 9/3265; H04L 9/006; H04L 9/0825; H04L 9/3268; H04L 9/30; H04L 63/0442; H04L 2209/72; H04L 2209/64; H04L 2209/38; H03M 2201/3142; H04N 21/6334; H04N 21/63345; H04W 12/471;
(Continued)

(56) References Cited

U.S. PATENT DOCUMENTS

2006/0048228 A1* 3/2006 Takemori .................. H04L 9/40
713/168
2013/0080321 A1* 3/2013 Mulhall ................. G06Q 30/02
705/41
(Continued)

FOREIGN PATENT DOCUMENTS

WO WO-2007079499 A2 * 7/2007 ......... H04L 63/0272

OTHER PUBLICATIONS

Scarlata, et al., "Supporting Third Party Attestation for Intel® SGX with Intel® Data Center Attestation Primitives." Retrieved from the internet, Sep. 1, 2022. 8 pages. https://www.intel.com/content/dam/develop/external/us/en/documents/intel-sgx-support-for-third-party-attestation-801017.pdf.

*Primary Examiner* — Joseph P Hirl
*Assistant Examiner* — Leynna Truvan
(74) *Attorney, Agent, or Firm* — LOWENSTEIN SANDLER LLP

(57) ABSTRACT

A platform identifier for a first node may be determined based on hardware characteristics of the first node. The platform identifier may be sent to a certification service via non-network communication. Certificate information associated with the platform identifier may be received from the certification service via non-network communication. A key pair may be generated at a first node application enclave of the first node. The key pair may include a public key of the first node and an associated private key of the first node. A request to generate a signed digital certificate may be sent to a digital certificate manager, the request including the public key of the first node and the certificate information. A signed digital certificate including the public key and the certificate information may be received from the digital certificate manager, and the signed digital certificate may be stored at the first node application enclave.

20 Claims, 12 Drawing Sheets

(58) Field of Classification Search
CPC ........... H04B 2203/5445; G06F 16/137; G06F 16/152; G06F 17/30109; G07B 2017/00782; G11B 20/00898
See application file for complete search history.

(56) References Cited

U.S. PATENT DOCUMENTS

| | | | |
|---|---|---|---|
| 2017/0006029 A1* | 1/2017 | Pedersen | H04W 12/50 |
| 2018/0123804 A1* | 5/2018 | Smith | H04L 9/0861 |
| 2021/0044976 A1* | 2/2021 | Avetisov | H04L 9/321 |

* cited by examiner

ESTABLISHING PROVENANCE OF APPLICATIONS IN AN OFFLINE ENVIRONMENT

TECHNICAL FIELD

Aspects of the present disclosure relate generally to security, and more specifically, relate to establishing provenance of software applications in an offline environment.

BACKGROUND

A certificate authority (CA) may issue digital certificates for other entities. For example, an issued digital certificate may include a public key of a particular entity. The certificate authority may further sign the digital certificate with the private key of the certificate authority. The digital certificate may be used to verify that the public key included in the digital certificate is owned by the particular entity. For example, when the particular entity provides the issued digital certificate to another entity, the other entity may verify the signature of the certificate authority. If the signature is successfully verified, then the other entity may use the public key included in the digital certificate to securely communicate with the particular entity.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
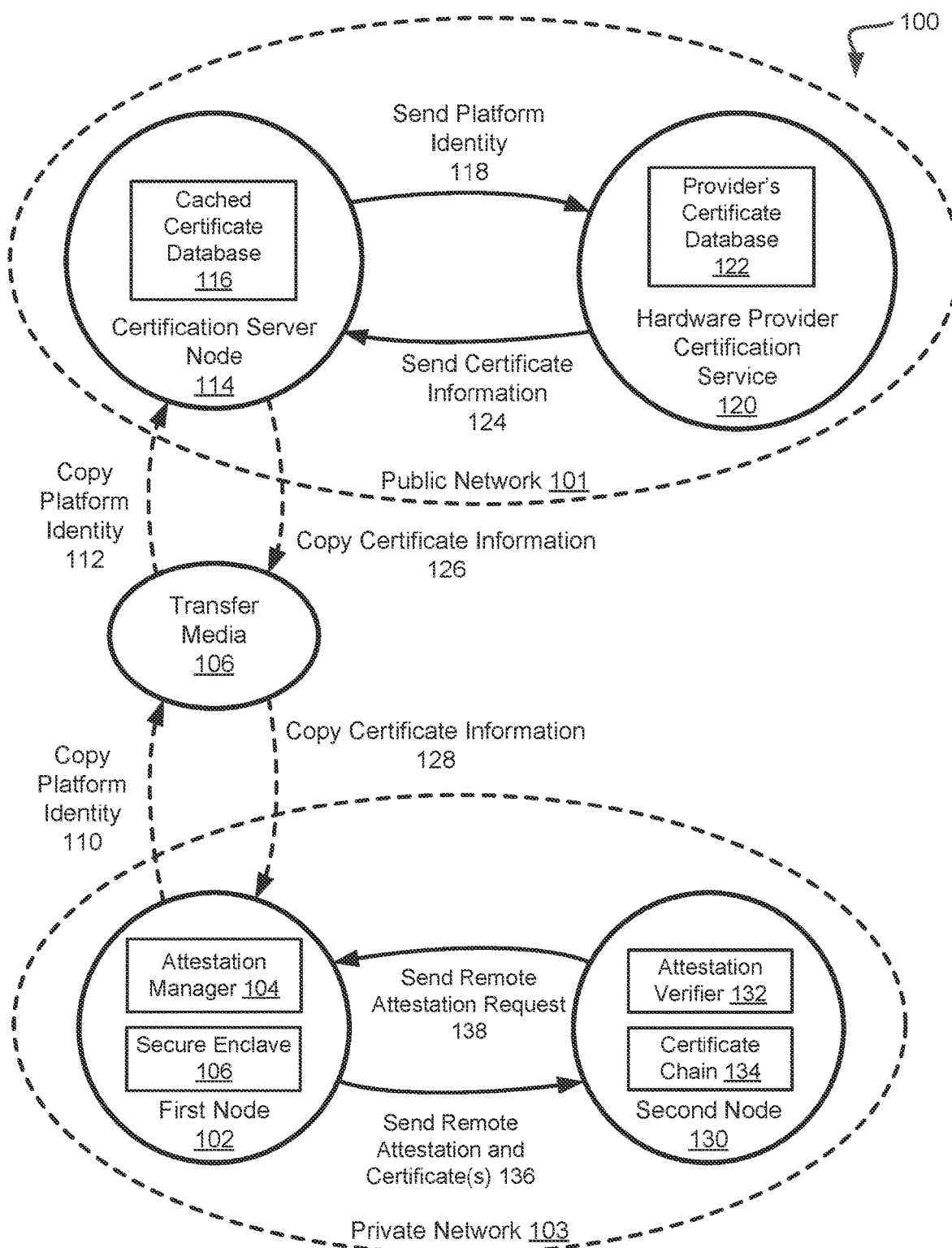
FIG. 1 illustrates an example environment to establish provenance of an application in an offline environment in accordance with particular embodiments of the present disclosure.

Aspects of the present disclosure relate to providing offline attestation of applications or other computer program code in a computing environment. In general, applications and infrastructure program code can be executed using secure enclaves to provide protection against unauthorized changes to the applications or infrastructure. Secure enclaves can use cryptography-based techniques to prevent or at least detect unauthorized changes to program code or data, including changes that occur at runtime. Such changes may indicate the program code or data has been modified or impersonated, and may perform or cause unauthorized or unexpected operations, potentially resulting in a range of problems such as incorrect results, unauthorized access of confidential information without proper authorization, data loss, and so on.

Attestation techniques can be used to verify that the program code is the code it claims to be according to a specification or other description. Verifying program code can involve determining whether the program code has been modified to be different than it claims to be, e.g., to perform different operations or use different data. Secure enclaves can include designated memory regions and associated enclave operations provided by a compute node's central processing unit (CPU) to verify the program code executing in the secure enclave. The CPU can protect the contents of the secure enclave (e.g., the program code and associated data) by preventing access to the contents by unauthorized program code. For example, the CPU can encrypt the contents when they are sent out of the enclave (e.g., evicted) to other (non-secure) memory, and decrypt the contents when they are loaded into the enclave from other memory.

Attestation can be used to provide an assurance that the contents of the secure enclave have not been modified. A cryptographic hash of the contents of a secure enclave in which the program code is running can be computed and compared to a known cryptographic hash of the authentic program code (and associated data). If the hash of the running program code matches the known hash, then the verification is successful, and the running program code can be verified as being authentic. Thus, a successful verification of the cryptographic hash of the secure enclave can provide an assurance that the contents of the secure enclave have not been modified.

It is possible that the compute node being attested has been compromised, so attestation performed by the compute node itself may be compromised, and is not necessarily trustworthy. This problem can be addressed using remote attestation, which uses a second compute node to verify that the intended software is executing within an enclave of a first compute node. In remote attestation, a cryptographic hash of an enclave on the first compute node can be digitally signed, e.g., encrypted, using a processor-specific cryptographic signing key. The digital signature of the cryptographic hash is referred to herein as a remote attestation. The term "remote attestation" herein may refer to a data value that is generated and verified as part of a remote attestation process. The remote attestation value can be sent to the second node via a communication network. The second node can verify the remote attestation using remote attestation infrastructure.

The processor-specific signing key used to sign a cryptographic hash is stored securely in the node (e.g., in the node's processor). The signature of the cryptographic hash can only be verified by an attestation service that has access to the key needed to verify that the cryptographic has was signed by a valid signing key. Ordinarily, in existing remote attestation techniques, the attestation service is provided by a manufacturer of the processors used in the compute nodes and is accessed via the Internet. Thus, remote attestation techniques involve communication between a compute node and the attestation service via a public computer network, such as the Internet. Further, existing remote attestation techniques can use an enrollment or installation process that prepares a compute node to be verifiable by remote attestation. The enrollment process can involve communicating with the attestation service via the Internet to verify that secure enclaves have been created correctly on the node. The term "Internet" is used herein as an example of a publicly-accessible network, and should be understood to refer to any publicly-accessible computer network or other unsecure computer network.

Because existing remote attestation techniques access an attestation service via the Internet, they are not suitable for use in environments in which the compute nodes are isolated from the Internet.

Compute nodes may be isolated from the Internet for security reasons, such as to prevent transfer of sensitive data from the nodes to unauthorized systems via the Internet. Since there is no wired or wireless network communication possible between the isolated nodes and the Internet, the node cannot be accessed by other, potentially malicious, systems. The separation that prevents communication between the isolated nodes and the Internet is referred to herein as an "air gap." However, existing remote attestation protocols that communicate with a remote attestation server via the Internet cannot be used to perform remote attestation for the isolated nodes because the air gap also prevents communication between an isolated node and the remote attestation server.

Aspects of the present disclosure address the above and other deficiencies by providing an "offline" attestation technique that can perform remote attestation on compute nodes that do not have access to the Internet or other pubic network. Offline attestation may be used, for example, to verify the identity of a node prior to allowing the node to join a cluster, or to verify that an application has not been modified and can be trusted to operate as expected. Offline attestation techniques can generate and verify remote attestations for a first node using a shared secret known to the first node and a certification service. As introduced above, offline attestation may use a shared secret, which may be provisioned at manufacturing time. The shared secret may be embedded into node processors and may also be used by an online certification service. The manufacturer or provider of the nodes may also provide the certification service, which may be accessible via the Internet or other public network.

The shared secret may have been provisioned into the first node's processor at the time the processor was manufactured, for example.

The certification service can generate certificate information to be used to verify the remote attestations. The certificate information can include digital certificates that can verify the authenticity of remote attestations of node enclaves. The first node can use the shared secret to generate remote attestations, e.g., by computing a hash value based on contents of a secure enclave of the first node and encrypting the hash value using an encryption key derived from the shared secret. The certificate information can be copied from the certification service to the first node using a non-network communication medium, such as a removable data storage device that is physically carried from an intermediary node that can, for example, receive the certificate information from the certification service via the public network.

A remote attestation value generated by a first node can be verified by a second node using certificate information provided by a certification service and transferred to the first node across an air gap. The certification service may be provided by a manufacturer of the node or of the node's processor, and ordinarily is accessible via a public communications network such as the Internet. The certificate information may be transferred to the first node across the air gap via transfer media such as a removable memory device that is physically carried between the first node and an intermediary node that has access to the certification service. After being transferred to the node, e.g., by being copied from the transfer media, the certificate information can be used to verify remote attestations for the node without communicating with the certification service, at least until a certificate contained in the certificate information expires or is revoked. A second node can verify remote attestations generated by the first node. The second node can request and receive the remote attestation from the first node via a private network. The private network may be, e.g., a network that is isolated from public networks, such as the Internet, via an air gap.

An installation process may be performed to prepare a first node to participate in remote attestation. In the installation process, the first node may send a platform identifier of the first node (e.g., a value that corresponds to the node's hardware) across an air gap to an intermediary node, e.g., via a removable storage device that can be physically carried to the intermediary node. The intermediary node may retrieve certificate information that corresponds to the platform identifier from the certificate service. The first node may obtain the certificate information from the intermediary node. For example, the intermediary node may send the certificate information across the air gap to the first node via the removable storage device. The certificate information may include a certification key (CK) certificate for a certification key derived from the shared secret described above.

The first node may generate a remote attestation by signing a cryptographic hash of the first node's enclave using a "signing key." Thus a remote attestation can be a digital signature of a cryptographic hash of the contents of the first node's enclave. The signing key may be the certification key (CK) derived from the shared secret, or an "attestation" key generated by the first node for which a certificate is signed by the certification key. The remote attestation can be verified by a second node using one or more digital certificates that contain public keys and are signed by higher-level authorities. The second node may obtain the digital certificates from a suitable source, such as a node certification authority accessible via the private network, another node accessible via the private network, or other source that can send or provide certificates to the second node. The certificate for the signing key may be part of a certificate chain, in which each certificate is signed by a higher-level authority.

If the signing key used to sign the remote attestation is a certification key (CK), then a CK certificate may be used to verify the remote attestation. In this case, the CK certificate may be verified using a root certificate of the manufacturer. If the signing key is an attestation key, then an attestation key certificate may be used to verify the remote attestation. The attestation key certificate may be verified using a CK certificate, and the CK certificate may be verified using a root certificate of the manufacturer.

Although certificates for use in verifying attestations can be provided from various sources as described above, an attestation manager may alternatively or additionally provide an "offline attestation certificate" that includes the remote attestation, one of more of the certificates to be used to verify the remote attestation (e.g., the CK certificate), and a signature that can be used to verify contents of the offline attestation certificate. The remote attestation in the offline attestation certificate can be verified as described above, except the digital certificate(s) can be retrieved from the contents of offline attestation certificate instead of being received separately from other sources. The signature in the offline attestation certificate can be created by, for example a Certificate Authority that signs the offline attestation certificate, or there can exist a certificate chain from a trusted Certificate Authority to the offline attestation certificate. As an alternative to using the signature in the offline attestation certificate, the second node can itself verify the contents of the offline attestation certificate (e.g., the remote attestation and the one or more certificates to be used to verify the remote attestation). The information in the offline attestation certificate can be used to verify that the offline attestation certificate was generated in a particular node's secure enclave. For example, the remote attestation can be based on a cryptographic hash of the particular node's public key. A verifying node can verify that the offline attestation certificate was generated in the particular node's secure enclave by computing a hash of the node's public key (which may be included in the offline attestation certificate) and determining whether the computed hash matches the value of the remote attestation.

Further, as an alternative or addition to verification of an offline attestation certificate by verifying its contents, verification of the offline attestation certificates may be performed by a certification authority (CA) upon a node's request. The CA may receive a verification request for a specified offline attestation certificate and verify the offline attestation certificate as described above using the remote attestation and certificates it contains. If the offline attestation certificate is successfully verified, then the CA may sign the offline attestation certificate using a CA private key and send the signed offline attestation certificate as response to the verification request. If the recipient of the response trusts the CA to only sign valid offline attestation statements, then the recipient may determine whether the remote attestation in the offline attestation certificate is valid by verifying the signature on the offline attestation certificate (e.g., using the CA's public key) instead of performing the remote attestation verification process described above.

Advantages of the present disclosure include, but are not limited to, the ability to perform remote attestation to verify the identity of compute nodes that do not have access to the Internet or other network. This ability may be useful, for example, on a private network that is isolated from the Internet for security reasons. According to the present disclosure, a first node on a private network can receive certificate information from an intermediary node via removable storage media or other physical communication media instead of via network communication. The intermediary node can communicate with a certification service via a public network to receive a portion of the certificate information from a provider of the nodes, such as a manufacturer. Since the nodes on the private network need not use network communication to obtain the certificate information, the private network can be isolated from the public network by removing or disabling network communication between the public and private networks so that no network traffic can pass between the public and private networks. The security of the nodes on the private network thus cannot be compromised via network communication with nodes outside the private network. For example, confidential information cannot be sent from the nodes on the private network to other nodes on a public network. As another example, attacks on the nodes on the private network cannot be made from nodes on the public network because there is no network communication path between the public and private networks.

FIG. 1 illustrates an example environment to establish provenance of an application in an offline environment in accordance with particular embodiments of the present disclosure. In general, the environment 100 may include a network cluster in which nodes 102 and 130 communicate with each other via a private network 103 and with a certification server node 114 via transfer media 106.

As shown in FIG. 1, the environment 100 may include a network cluster in which nodes 102 and 130 communicate with each other via a private network 103. The private network 103 is isolated from the public network 101 to prevent network communication between the private network 103 and the public network 101. Since there is no network connectivity between the private network 103 and the public network 101, data cannot be communicated between the private and public networks using ordinary wired or wireless network communication protocols such as TCP/IP, WIFI, Ethernet, or the like. This isolation of the private network 103 from the public network 101 can protect the nodes 102, 130 on the private network 103 from data security breaches, malware, viruses, and other security violations.

Since there is no network connectivity between the first node 102 and the certification server node 114, there is said to be an "air gap" between the first node 102 and the certification server node 114. Data can be sent across the air gap using transfer media 106 or other communication methods that do not rely on network connectivity between the private network 103 and the public network 101. For example, data can be sent between the private network 103 and the public network 101 by physically interfacing the transfer media with a node on the private network, copying the data to the transfer media 106, physically moving the transfer media 106 from the node on the private network to a node on the public network, physically interfacing the transfer media with a node on the public network. and copying the data from the transfer media 106 to the node on the public network. The transfer media 106 may be, e.g., removable storage media such as a flash memory drive, a hard disk or other machine-readable storage media, a near-field data communication device, or other data transfer mechanism.

As a result of this isolation from the public network 101, ordinary remote attestation of a first node 102 on the private network 103, which would involve network communication between the first node 102 and the certification server node 114 (or the hardware provider certification service 120), cannot be used to verify the identity of the first node 102. The certification server node 114 can act as a cache for the HW provider certification service 120. Nodes on the private network 103 cannot directly communicate with the HW provider certification service 120 either (e.g., bypassing the certification server node 114), because the certification service 120 is also on the public network 101 and therefore isolated from the private network 103. Although the certification server node 114 is described as an intermediary cache for the HW provider certification service 120 in particular examples, the certification server node 114 may itself be an HW provider certification service 120, in which case the separate HW provider certification service 120 may be omitted. Alternatively, the certification server node 114 may be omitted, in which case data may be copied between the transfer media 106 and the HW provider certification service 120 instead of between the transfer media 106 and the certification server node 114. The certification server node 114 and/or the HW provider certification service 120 may be provided, for example, by a provider of the nodes 102, 130, the HW provider, or a combination of those. The provider of the nodes may be, but is not necessarily, a manufacturer of the nodes or of the processors in the nodes.

Offline attestation techniques disclosed herein can be performed to generate and verify remote attestations for nodes 102, 130 that do not have access to the public network 101. Offline attestation may use a shared secret, which may be provisioned at manufacturing time. The shared secret may be embedded into node processors and may also be used by the HW provider certification service 120 to establish shared encryption keys. For example, offline attestation may use a certification key ("CK") to generate remote attestations of a secure enclave 106 on the first node 102 by encrypting local attestation data (e.g., a cryptographic hash of contents of the secure enclave 106) using the CK. The CK may be derived from the shared secret and may be known to the first node 102 and the HW provider certification service 120. Offline attestation may further use a certification key certificate ("CK certificate") to verify signatures made with the CK. The HW provider certification service 120 may generate the CK certificate, e.g., by signing the public key portion of the CK with a root key of the HW provider certification service. Thus, a remote attestation can be verified at node 130 by using the CK certificate to verify that the remote attestation was properly signed (at node 102) with the CK key and using the root key certificate to verify that the CK certificate was properly signed with the HW provider's root key. The CK certificate may be generated for a particular node 102 based on a platform identifier of the node 102. The HW provider certification service 120 may store the CK certificate for a particular node in a provider's certificate data store (e.g., database) 122 in association with a platform identifier that uniquely identifies the node. Note that the term "offline" as used herein refers to the first and second nodes 102, 130 being isolated from the public network 101 used by certification server node 114 to access HW provider certification service 120. That is, the nodes of the private network 103 are offline relative to the public network 101.

In offline attestation techniques, a second node 130 can verify a remote attestation generated on the first node 102 using certificate information that includes the CK certificate for the first node 102 and the HW provider's root certificate. The certificate information can be obtained by the certification server node 114 from the hardware provider certification service 120, then copied from the certification server node 114 to the first node 102 across the air gap via transfer media 106. The certificate information can then be sent from the first node 102 to the second node 130 (e.g., via the private network) so that the second node 130 can use the certificate information to verify remote attestations generated by the first node 102. Alternatively or additionally, the CK certificate and root certificate can be copied from the transfer media 106 directly to the second node 130, e.g., by interfacing the transfer media 106 with the second node 130 and copying the certificate information from the transfer media 106 to the second node 130.

To prepare for offline attestation, an attestation manager 104 executing on the first node 102 may request certificate information, such as a CK certificate for the first node 102, by sending the platform identity of the first node 102 to the certification server node 114. The platform identity may be sent by, for example, copying the platform identity to transfer media 106 (arrow 110) while the transfer media 106 is physically connected to or in physical proximity to the first node 102. The transfer media 106 may then be physically carried or otherwise transported (e.g., moved) to the certification server node 114. The transfer media may be removed from the first node 102, if necessary, prior to being transported. The certification server node 114 may be, but is not necessarily, a short physical distance from the first node 102. The certification server node 114 may be hosted on a server of a local network, and the server may be capable of reading and writing data on transfer media 106. The platform identity may be copied from the transfer media 106 to the certification server node 114 while communication between the certification server node 114 and the transfer media is possible (arrow 112). Communication may be possible while the transfer media 106 is physically connected to or in physical proximity to the certification server node 114, for example.

Although data is described as being copied between the public network 101 and the private network 103 via transfer media 106 in particular examples herein, in other examples data can be communicated between the public network 101 and the private network 103 in any suitable way that does not establish network connectivity between the public network 101 and the private network 103.

The certification server node 114 may send the copied platform identity to the HW provider certification service 120 (arrow 118) via the public network 101. The HW provider certification service 120 may generate the certificate information, including the CK certificate and the root certificate and CK, if needed, based on the platform identifier. The certification service 120 may then send the certificate information to the certification server node 114 (arrow 124) via the public network 101. The certification server node 114 may store the received CK certificate and associated platform identifier in a cached certificate data store (e.g., database) 116 or other suitable storage facility. Certificate information retrieved from the HW provider certification service 120 may be stored in the cached certificate database 116 for subsequent retrieval without repeatedly requesting the same certificate information (e.g., for the same platform identifier) from the HW provider certification service 120, at least until the certificate information expires or is revoked. The certification server node 114 may send certificate information, which may include the CK certificate and other associated information, such as the platform identifier and certificate revocation lists, to the first node 102 by copying the certificate information to the transfer media 106 (arrow 126).

The transfer media 106 may be removed or ejected from the certification server node 114 (if appropriate) and transported (e.g., physically carried) to the first node 102, or to within a threshold proximity of the first node 102. The transfer media 106 may be inserted in or interfaced with the first node 102, and the certificate information may be copied from the transfer media 106 to the first node 102 (arrow 128).

The certificate information copied from the certification server node 114 to the first node 102 can be used to perform offline attestation to verify the identity of a node 102. The offline attestation does not involve network communication between the first node 102 and the certification server node 114 (or the HW provider certification service 120). Further, the data communicated between the first node 102 and the certification server node 114 may be restricted to particular data items, such as a platform identity sent from the first node 102 to the certification server node 114, and certificate information sent from the certification server node 114 to the first node 102. Restricting the communicated data to specific items such as the platform identity and the certificate information reduces the vulnerability of the offline attestation to attacks by preventing arbitrary data from being sent between the private and public networks via the transfer media 106.

As shown in FIG. 1, the second node 130 can send a remote attestation request to the first node 102 (arrow 138) to initiate offline remote attestation of the first node 102. An attestation manager 104 on the first node 102 may receive the remote attestation request and generate a remote attestation by signing a cryptographic hash of the first node's secure enclave 106 using a "signing key." The signing key may be the CK. Alternatively, the signing key can be an "attestation" key, which may be a private key generated by the first node 102 for which an attestation key certificate is signed by the certification key. The attestation key may be used to prevent the CK from being made available to other nodes such as the second node 130, as the CK may be confidential, or may be more difficult or inconvenient to change than the attestation key. The first node 102 can send the remote attestation to the second node 130 (arrow 136) for verification. The first node 102 can also send the certificate information, including the CK certificate, attestation key certificate (if present), and root certificate to the second node. Alternatively or additionally, the certificate information can be sent from the first node 102 to a digital certificate manager, and retrieved from the digital certificate manager by the second node 130. The certificate for the signing key may be part of a certificate chain, so that each certificate from the certificate for the attestation key (if used), to the certification key certificate (which may certify the attestation key certificate) to a root certificate (which may certify the attestation key certificate) may be provided to the second node 130. The certificates form a certificate chain, which may be stored at the second node 130 as a certificate chain 134.

An attestation verifier 132 on the second node 130 can verify the remote attestation by verifying the certificates in the certificate chain 134 and, if each certificate in the chain is valid, and contents of the secure enclave 106 are to be verified, verifying that an enclave hash value included in the remote attestation matches an expected enclave hash value. As an example, if the signing key is the CK, the attestation verifier 132 can verify the CK certificate using the root certificate of the HW provider. As another example, if the signing key is an attestation key, the attestation verifier 132 can verify the remote attestation using the attestation key certificate, the attestation key certificate can be verified using the CK certificate, and the CK certificate can be verified using the root certificate. If the certificate and hash value verifications are successful, then the remote attestation is successfully verified. The expected enclave hash value may be computed based on the content (e.g., code and data) that the secure enclave 106 being verified is expected to have.

As introduced above and described in more detail below with regards to FIGS. 2A-2C, each node 102 may include a secure enclave 106 in which code and data may be stored. The code and data stored in a secure enclave may not be read from or written to except by the secure enclave. A secure enclave refers to a private region of memory that is associated with a processor of the node 102 and stores information, including program code and data, which cannot be accessed by program code executed by the processor from memory locations outside the enclave. The program code and data are stored in the enclave in an encrypted form that can only be decrypted by the processor using a decryption key, which is also known only to the processor. The processor only decrypts the information in the enclave when the information is accessed by code running within the enclave. Thus the information stored in the secure enclave is inaccessible to applications and the operating system executed by the processor unless the code in the enclave specifically sends the information out of the enclave. Each node 102, 130 may include a platform identity that may correspond to a unique identification (e.g., any combination of numbers or letters) of the respective node. The platform identity may be implemented in silicon (e.g., a circuit) of the node, or a value that is generated from hardware characteristics of the device, for example.

Figure 2A:
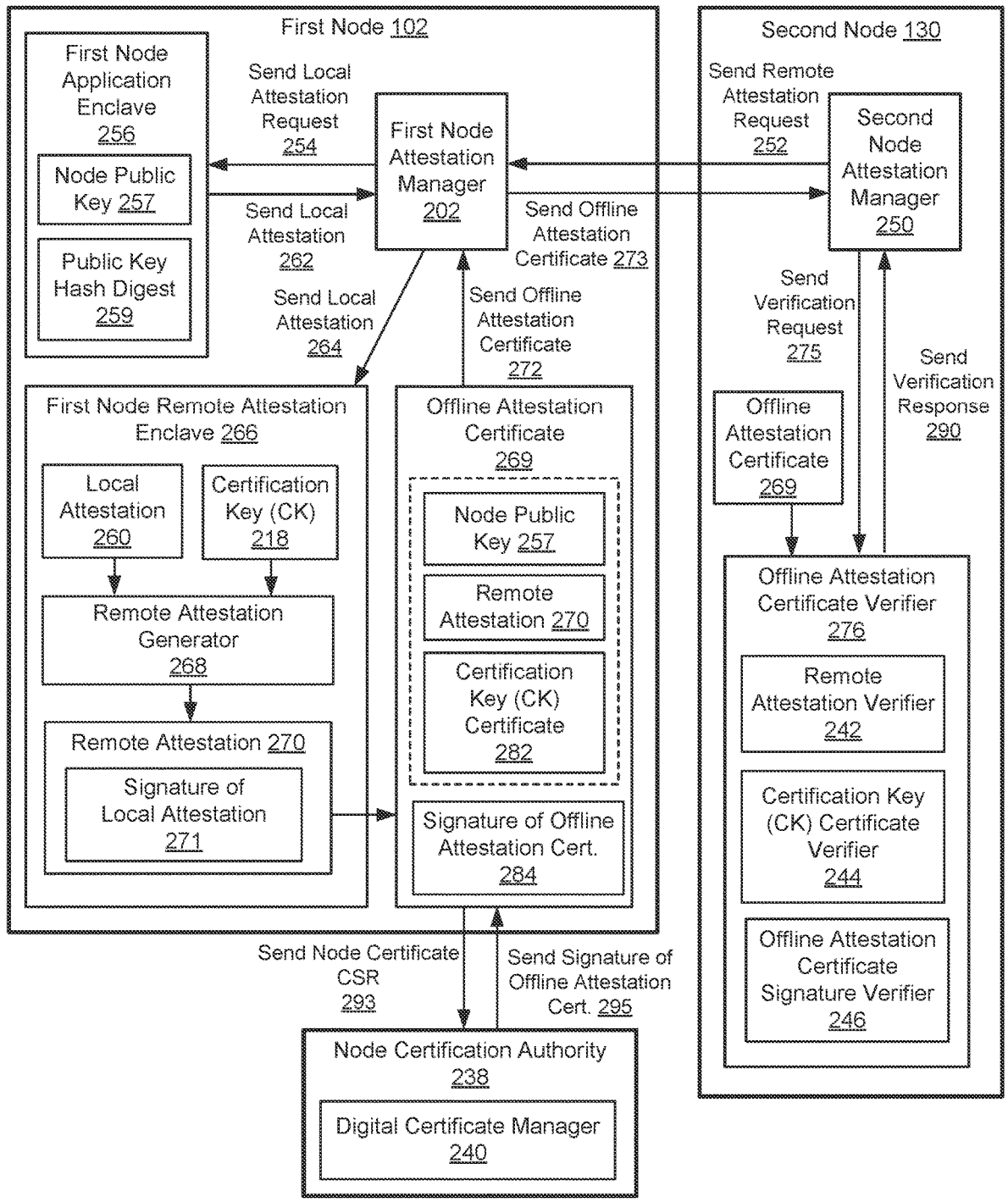
FIG. 2A illustrates example compute nodes that generate and verify offline attestation certificates in accordance with particular embodiments of the present disclosure.

FIG. 2A illustrates example compute nodes that generate and verify offline attestation certificates in accordance with particular embodiments of the present disclosure. In general, a first node 102 may generate an offline attestation certificate 269 in response to a request from a second node 130, and the second node 130 may verify the offline attestation certificate 269.

As shown in FIG. 2A, a first node 102 may include a first node application enclave 256 in which application data can be stored. The application data may include both code and data. A node public key 257 can be generated in the enclave 256, e.g., using an RSA public key/private key pair generator executing in the enclave 256. A public key hash digest 259 can be computed based on the public key 257, e.g., using a cryptographic hash function such as SHA-1 or the like. A local attestation value can be generated based on contents of the enclave 256. The local attestation may be, e.g., a cryptographic hash digest of the contents of the enclave 256, including the public key hash digest 259 and other data stored in the enclave 256 (not shown). The enclave 256 may send the local attestation to the first node attestation manager 202 (arrow 262). The local attestation may be generated by the enclave 256 in response to a local attestation request received from the first node attestation manager 202 (arrow 254), for example. The first node attestation manager 202 may generate the local attestation request in response to a remote attestation request received from another node 130 (arrow 252), for example.

The first node attestation manager 202 may forward the local attestation request to a first node remote attestation enclave 266 (arrow 264). The remote attestation enclave 266 may generate a remote attestation 270 to be included in an offline attestation certificate 269. The first node remote attestation enclave 266 may include a remote attestation generator 268, which may sign the local attestation 260 using a signing key, which may be cryptographic key such as a certification key (CK) 218 and generate a remote attestation 270. The remote attestation 270 may include a signature of the local attestation 271 produced by signing the local attestation 260 using the signing key. The remote attestation 270 may be passed from the first node remote enclave 266 to an offline attestation certificate generator (not shown), which may create an offline attestation certificate 269 that includes the node public key 257, the remote attestation 270, a certificate key (CK) certificate 282, and a signature (of the offline attestation certificate) 284. The signature 284 may be generated by signing the other contents of the offline attestation certificate 269, including the node public key 257, the remote attestation 270, and the CK certificate 282 using a key. Thus, the node certification authority 238 can generate a public/private key pair. The generated node public key (of the pair) can be assumed to be shared already by any identity wishing to verify node certificates. Alternatively, the generated node public key can be signed by another Certificate Authority that is trusted. For example, the node certification authority 238 may sign the offline attestation certificate 269 in response to a request (arrow 293) and add the signature 284 to the offline attestation certificate 269 (arrow 295). The offline attestation certificate 269 may be sent to the first node attestation manager 202 (arrow 272), which may in turn send it to the second node attestation manager 250 on the second node 130 (arrow 273).

The second node attestation manager 250 on the second node 130 may send a verification request, including the offline attestation certificate 269 received from the first node 102, to an offline attestation certificate verifier 276 (arrow 275). The offline attestation certificate verifier 276 may verify the remote attestation 270, the CK certificate 282, and the signature (of the offline attestation certificate) 284 using a remote attestation verifier 242, a CK certificate verifier 244, and an online certificate signature verifier 246, respectively. The CK certificate verifier 244 may verify the CK certificate using a root certificate of the manufacturer or provider of the first node 102. The online certificate signature verifier 246 may verify the signature (of the online attestation certificate) 284 by submitting the signature 284 to the node certification authority 238 for verification. Alternatively, the online certificate signature verifier 246 may use a public key that corresponds to a private key used to sign the online attestation certificate 269 to verify the signature 284.

The remote attestation verifier 242 may verify that the remote attestation 270 contains the public key hash digest 259. For example, the remote attestation verifier 242 may verify the digital signature 271 included in the remote attestation using the public key included in the certificate information (e.g., by decrypting the digital signature 271 using a public key included in the certificate information to produce a decrypted hash digest, and determining whether the decrypted hash digest corresponds to an expected enclave identity hash digest). The public key may be an attestation public key if the certificate is an attestation certificate, or CK public key if the certificate is a CK certificate, for example. The digital signature may be determined to be successfully verified when the decrypted hash digest corresponds to (e.g., matches) the expected enclave identity hash digest.

If the online attestation certificate verifier 276 determines that each element of the online attestation certificate 269 has been successfully verified—e.g., the combination of the node public key 257, remote attestation 270, and CK certificate 282 matches the signature 284 of the online attestation certificate, the remote attestation 270 is successfully verified, and the CK certificate 282 is successfully verified—then the verifier 276 may send a verification response indicating success to the second node attestation manager 250 (arrow 290). The second node attestation manager 250 may then determine that the identity of the first node 102 has been verified successfully. In response to successfully verifying the digital signature included in the remote attestation, the second node 130 may perform an action, such as sending a master key to the first node if the verification is performed in response to a request from the first node 102 to join a cluster.

Figure 2B:
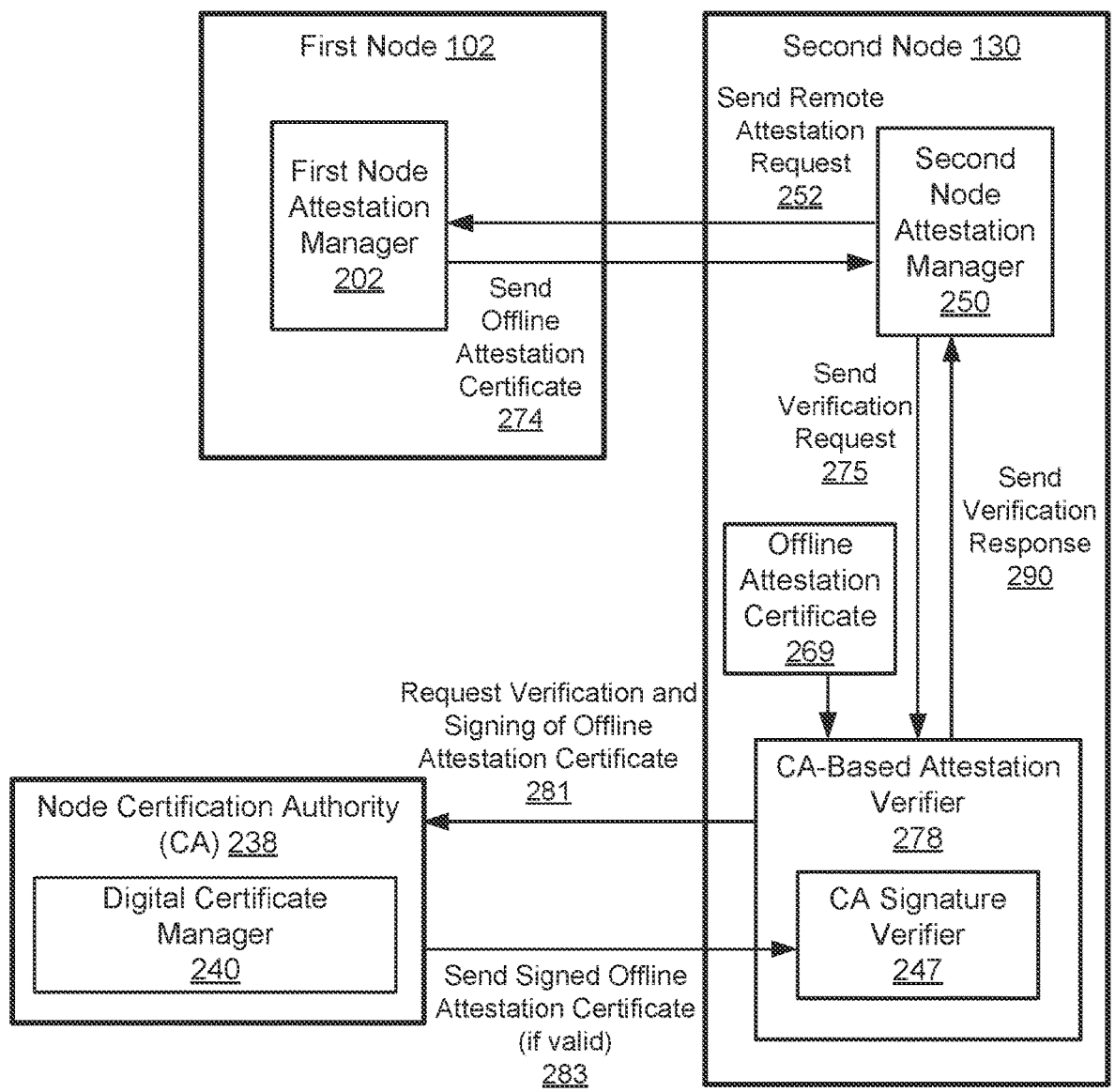
FIG. 2B illustrates an example compute node that verifies offline attestation certificates using a certification authority in accordance with particular embodiments of the present disclosure.

FIG. 2B illustrates an example compute node that verifies offline attestation certificates using a certification authority in accordance with particular embodiments of the present disclosure. In general, a second node 130 may request that a node certification authority (CA) 238 verify an offline attestation certificate 269.

As shown in FIG. 2B, a second node attestation manager 250 of a second node 130 may send a remote attestation request to a first node attestation manager 202 of a first node 102 (arrow 252). The first node attestation manager 202 may generate and send an offline attestation certificate 269 to the second node attestation manager 250 (arrow 274). To verify the offline attestation certificate 269, the second node attestation manager 250 may send a verification request and the offline attestation certificate 269 to a CA-based attestation verifier 278 (arrow 275). The verifier 278 may send a request for verification and signing of the offline attestation certificate 269 to a node certification authority (CA) 238 (arrow 281). The node CA 238 may perform an offline attestation certificate verification process, e.g., as described above with reference to FIG. 2A. If the verification process determines that the offline attestation certificate 269 contains a valid remote attestation, then the node CA 238 may sign the offline attestation certificate 269 (e.g., using a node private key) and send the signed offline attestation certificate 269 to the verifier 278 (arrow 283). The verifier 278 may use a CA signature verifier 247 to verify that the offline attestation certificate 269 has a valid signature. If the signature is valid, the verifier 278 may send a verification response to the second node attestation manager 250 indicating that the verification is successful and the offline attestation certificate 269 contains a valid remote attestation (arrow 290). Otherwise, if the signature is not valid, then the verifier 278 may send a verification response to the second node attestation manager 250 indicating that the verification is unsuccessful and the offline attestation certificate 269 does not contain a valid remote attestation.

Figure 2C:
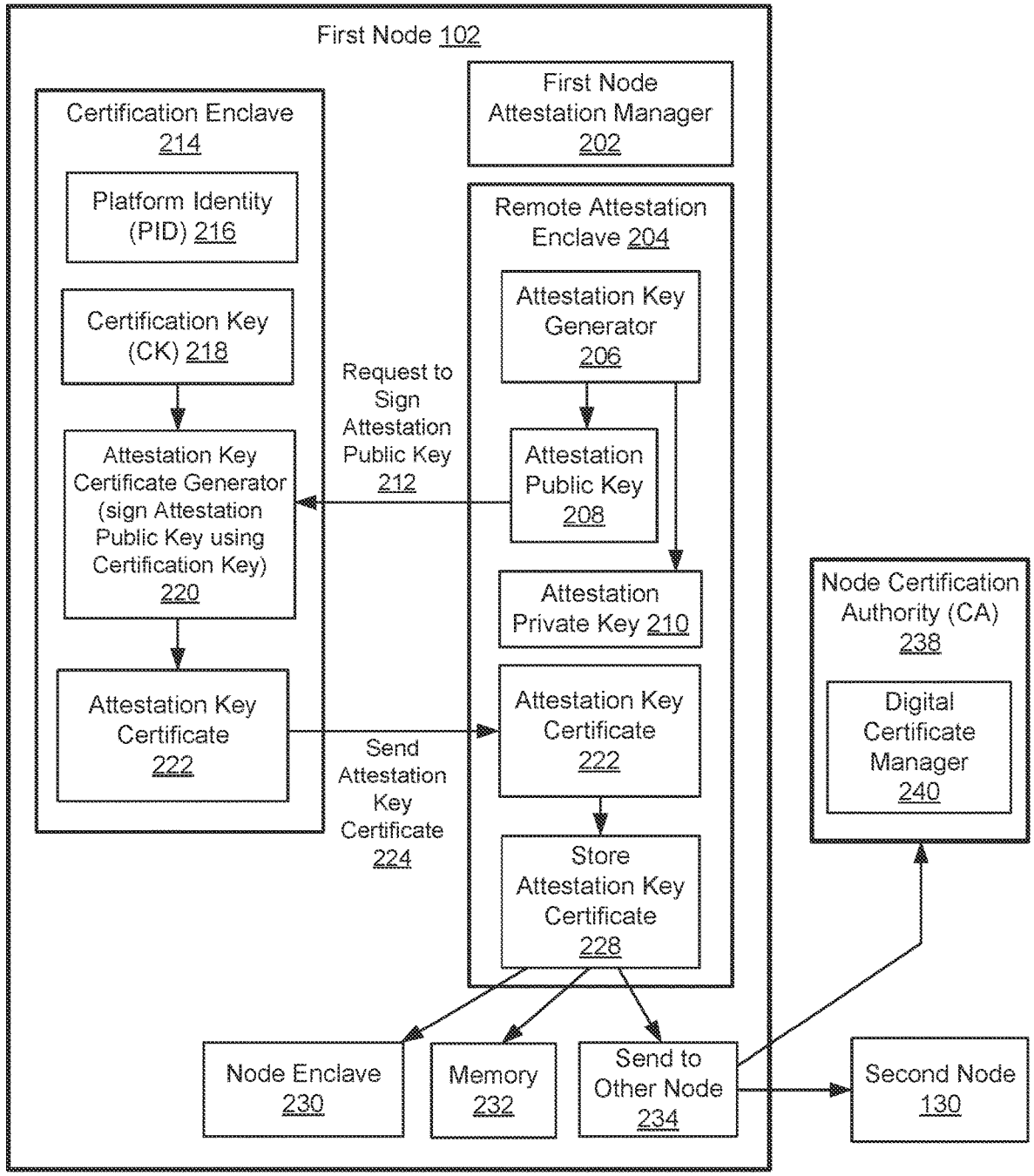
FIG. 2C illustrates an example compute node with an attestation manager that uses secure enclaves to generate and store offline attestation certificate information in accordance with particular embodiments of the present disclosure.

FIG. 2C illustrates an example compute node 102 with an attestation manager that uses secure enclaves to generate and store offline attestation certificate information in accordance with particular embodiments of the present disclosure. In general, the first node 102 includes a first node attestation manager 202, a remote attestation enclave 204 in which attestation keys and remote attestations can be generated, and a certification enclave 214 in which attestation public keys 208 can be signed to generate attestation key certificates 222.

As shown in FIG. 2C, a platform identity (PID) 216 that identifies the first node 102 may be stored in the certification enclave 214. The platform identity 216 may be determined based on hardware properties of the first node 102 and a certification key (CK) 218 that corresponds to the platform identity 216 and has been copied from transfer media 106 or otherwise received via non-network communication. The first node attestation manager 202 can cause an attestation key generator 206 located in the remote attestation enclave 204 to generate an attestation public/private key pair. The attestation key pair may be used so that the CK 218 need not be made available to other nodes such as the second node 130. The CK may be confidential, or may be more difficult or inconvenient to change than the attestation key pair.

The attestation key pair may include an attestation public key 208 and a corresponding attestation private key 210. The attestation manager 202 may cause a request to sign the attestation public key 208 (arrow 212) to be sent to an attestation key certificate generator 220 in a certification enclave 214 of the first node 102. The attestation key certificate generator 220 may generate an attestation key certificate 222 by signing the attestation public key 208 using a certification key (CK) 218. The attestation key certificate 224 can be sent to the remote attestation enclave 204 (arrow 224). The attestation key certificate 222 can be stored (block 228) at, for example, a node enclave 230, memory 232 of the node 102, second node 130, digital certificate manager 240 of node certification authority 238, or other suitable storage media.

Figure 2D:
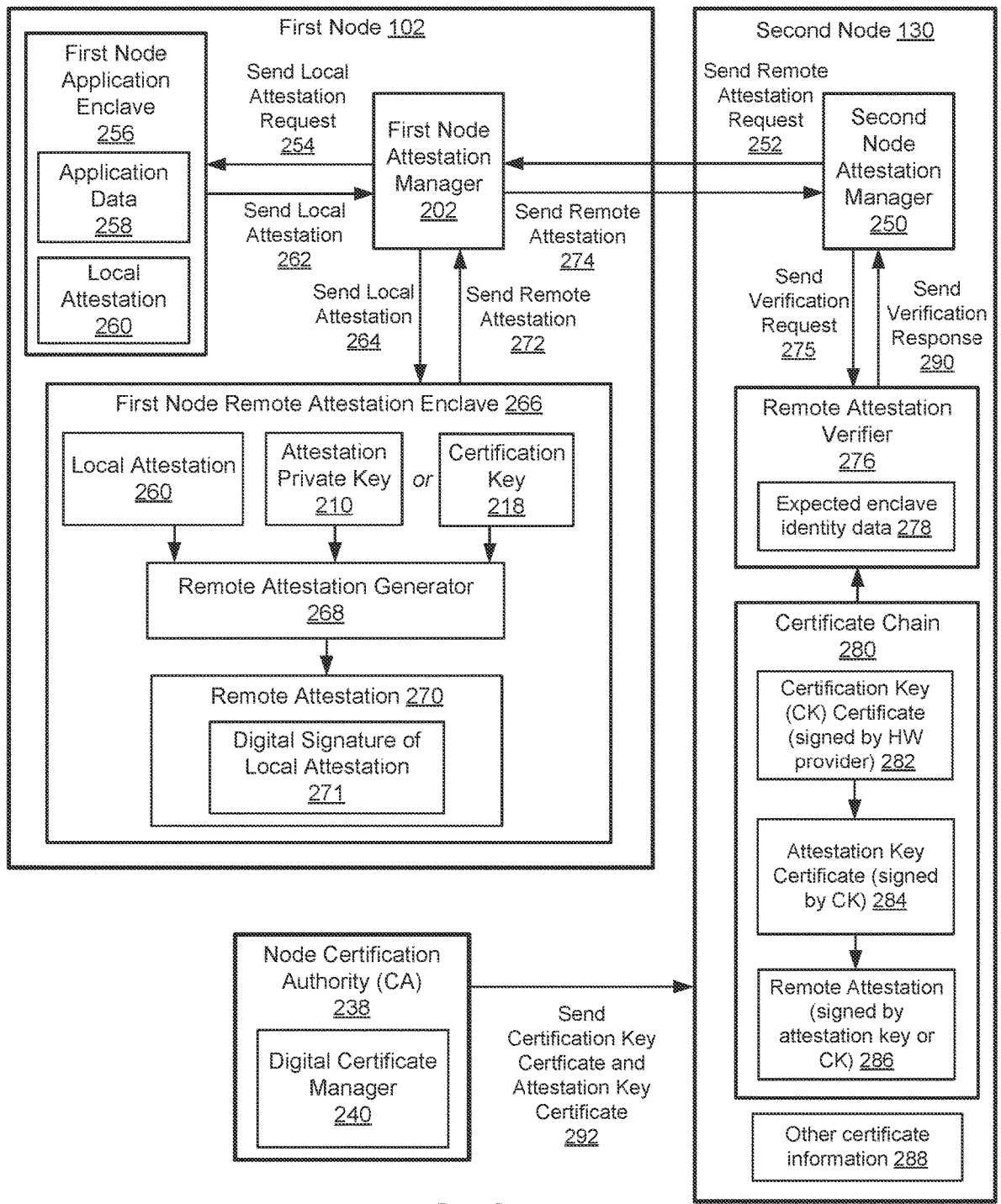
FIG. 2D illustrates example compute nodes that generate and verify remote attestations using offline attestation certificate information in accordance with particular embodiments of the present disclosure.

FIG. 2D illustrates example compute nodes 102, 130 that generate and verify remote attestations 270 using offline attestation certificate information in accordance with particular embodiments of the present disclosure. In general, a first node 102 may generate a remote attestation 270 in response to a request from a second node 130, and the second node 130 may verify the remote attestation.

As shown in FIG. 2D, a first node 102, which may correspond to the first node 102 of FIG. 2C, may include a first node application enclave 256 in which application data 258 is stored. The application data may include both code and data. A local attestation 260 of the contents of the enclave 256 may be generated by computing a cryptographic hash on the contents of the enclave 256 including the application data 258 (if any is present). The local attestation 260 may be stored in the enclave 256 or in memory outside the enclave 256. The first node 102 may generate a remote attestation 270 in response to a remote attestation request 252received from a second node 130 (arrow 252) and send the remote attestation 270 to the second node 130 (arrow 274). An attestation verifier 276 located on the second node 130 may verify the remote attestation 270 using a certificate chain 280, expected enclave identity data 278, and optional other certificate information 288 such as certificate revocation lists. Further, as described above with reference to FIG. 2A, a node public key 257 can be generated in the enclave 256, e.g., using an RSA public key/private key pair generator executing in the enclave 256. A public key hash digest 259 can be computed based on the public key 257, e.g., using a cryptographic hash function such as SHA-1 or the like.

A second node attestation manager 250 located on the second node 130 may send a remote attestation request to a first node attestation manager 202 on the first node 102 (arrow 252). The remote attestation request may be sent, for example, in response to a request from the first node to join a cluster of which the second node 130 is a member, in which case the application data 258 in the first node application enclave 256 may include information identifying the first node 102. Each node can generate its own public/private key pair. The hash of the node's public key can be used as or included in the node's application data 258, and included in the local attestation 260 and remote attestation 270. A remote attestation request received by the first node (arrow 252) can include a nonce value. When a remote attestation request 252 (with a nonce) is received by the first node 102 (arrow 252), the first node 102 can (a) sign the nonce signed with the first node's private key, and (b) return the offline attestation certificate 269 to the second node 130 (e.g., as part of sending the remote attestation to the second node 130 at arrow 274). The second node 130 can (c) verify that the nonce value it sent to the first node 102 has been signed by the private key of the first node 102 using the public key the second node 130 retrieves from the offline attestation certificate 269 and (b) verify that the offline attestation certificate 269 can be trusted. This verification thus verifies the identity of the first node 102. As another example, the remote attestation request may be sent in response to a request to verify the identity of an application stored in the first node application enclave 256 of the first node 102.

The first node attestation manager 250 may receive the remote attestation request (arrow 252) and, in response, send a local attestation request to the first node application enclave 256 (arrow 254). A local attestation 260 of the first node application enclave 256 may be generated, e.g., by computing a cryptographic hash on the contents of the application enclave 256. The local attestation 260 may include the cryptographic hash and other information, such as an identity of an application, a cryptographic hash of a public key of the application, and so on. The local attestation 260 may be sent from the application enclave 256 to the first node attestation manager 202 (arrow 262). The attestation manager 202 may forward the local attestation 260 to the first node remote attestation enclave 266 (arrow 264). A remote attestation generator 268, which may be implemented by program code stored in the remote attestation enclave 266, may generate the remote attestation 270 by, for example, signing the local attestation (including the hash of the application enclave 256) using a signing key. The signing key may be the attestation private key 210 or the certification key (CK) 218, as described above. The remote attestation 270 may thus include a digital signature 271 of the local attestation generated using the signing key.

The remote attestation 270 may be sent from the remote attestation enclave 266 to the first node attestation manager 202 (arrow 272), and from there to the second node attestation manager 250 on the second node 130 (arrow 274). The second node attestation manager 250 may send a verification request to an attestation verifier 276 (arrow 275). The verification request may include or identify the remote attestation 270 to be verified. The second node 130 may also receive certificate information to be used for verification of the remote attestation 270. For example, the certificate information may include the CK certificate, the attestation key certificate (if used to generate the remote attestation 270), or both. The second node 130 may receive the certificate information from a node certification authority 238 (arrow 292) or from the first node 102, for example. The certificate information may be stored in a digital certificate manager 240 the node certification authority 238 by a digital certificate manager 240, which may maintain a data store (e.g., a database) of certificate information and associated platform identifiers.

The attestation verifier 276 may verify the remote attestation 270 as described above with reference to the attestation verifier 132 of FIG. 1. For example, the attestation verifier 276 may verify that the certificates in the certificate chain 280 are valid and, if each certificate in the chain is valid, verify that an enclave hash value included in the remote attestation matches an expected enclave hash value (if present). For example, the attestation verifier 276 may verify a digital signature included in the remote attestation 270 using the certificate information. The attestation verifier 276 may verify the digital signature included in the remote attestation 270 using the certificate information by decrypting the digital signature included in the remote attestation using a public key included in the certificate information to produce a decrypted hash digest, and determining whether the decrypted hash digest corresponds to an expected enclave identity hash digest. The public key may be an attestation public key if the certificate is an attestation certificate, or CK public key if the certificate is a CK certificate, for example. The digital signature may be determined to be successfully verified when the decrypted hash digest corresponds to (e.g., matches) the expected enclave identity hash digest. In response to successfully verifying the digital signature included in the remote attestation, the second node 130 may perform an action, such as sending a master key to the first node if the verification is performed in response to a request from the first node 102 to join a cluster.

Figure 3:
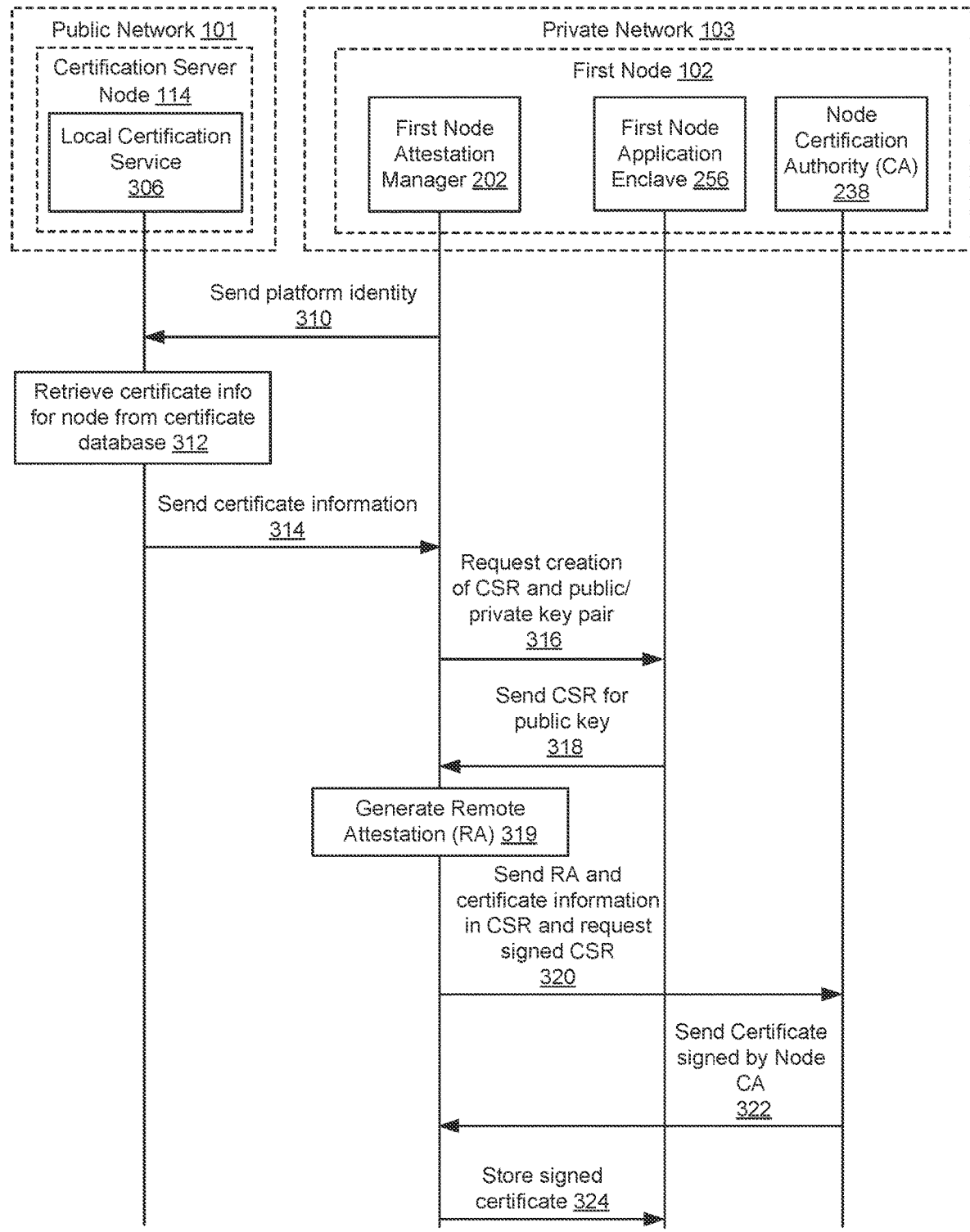
FIG. 3 is an interaction diagram of an example method to obtain certificate information from a certification service across an air gap in accordance with particular embodiments of the present disclosure.

FIG. 3 is an interaction diagram in which a first node 102 communicates across an air gap to obtain certificate information from a certification server node 114 in accordance with particular embodiments of the present disclosure. In general, the first node 102 may obtain the certificate information via transfer media 106, such as a removable storage device, from a certification server node 306.

As shown in FIG. 3, the first node 102 can communicate via a private network 304, e.g., with other nodes (not shown). However, as described above with reference to FIG. 1, the first node 102 does not have network connectivity to a public network 101 because the private network 103 is isolated from the public network 101. Thus, the first node 102 is unable to send data to or receive data from the certification server node 114 (on which local certification service 306 is located) via network communication. Data can be sent between the first node 102 and the certification server node 114 via non-network communication, such as transfer media 106, as described above with reference to FIG. 1.

The first node 102 includes a first node attestation manager 202, a first node application enclave 256 in which code and data can be stored, and a node certification authority ("CA") 238 in which certificates can be stored. The first node attestation manager 202 can send the platform identity of the first node 102 across the air gap via the transfer media 106 to the local certification service 306 on the certification server node (arrow 310). The platform identity may be sent as described with reference to FIG. 1, in which the platform identity is copied from the first node 102 to the transfer media 106 (arrow 110) and from the transfer media 106 to the certification server node 114 (arrow 112).

The local certification service 306 on the server node 306 may read the platform identity from the transfer media 106 at block 312 and identify or determine certificate information for the platform identifier. For example, the local certification service 306 may search the cached certificate database 116 for the platform identifier. If a match is found, then the certification service 306 may retrieve the certificate information associated with the platform identifier from the cached certificate database 116. If a match is not found, then the certification service 306 may request and receive certificate information for the platform identity from a hardware provider certification service 120, as shown in FIG. 1, and store the received certificate information in the cached certificate database 116 in association with the platform identity. The certification service 306 may send the certificate information to the first node attestation manager 202 across the air gap (arrow 314). The certificate information may be sent to the first node attestation manager 202 as described with reference to FIG. 1, in which the certificate information is copied from the certificate server node 114 to the transfer media 106 (arrow 126) and from the transfer media 106 to the first node 102 (arrow 128).

The first node attestation manager 202 may receive the certificate information, e.g., by copying the certificate information from the transfer media 106. The first node attestation manager 202 may then send a request to the first application enclave 256 to create a Certificate Signing Request (CSR) and a public/private key pair for the first node 102 (arrow 316). The first node application enclave 256 may create the CSR, include the public key in the CSR, and send the CSR to the first node attestation manager 202 (arrow 318). The first node attestation manager 202 may generate a remote attestation ("RA") (block 319) as described above with reference to FIG. 2D, for example. The first node attestation manager 202 may add the remote attestation and the certificate information received from the local certification service 306 to the CSR, then send the CSR to the node certification authority ("node CA") 238 to request that the CSR be signed (arrow 320). The node CA 238 may generate a signed offline attestation certificate in response to receiving the CSR. The signed offline attestation certificate may include the remote attestation and the certificate information received from the certification server node 144. The node CA 238 may send the signed offline attestation certificate to the first node attestation manager 202 (arrow 322). The first node attestation manager may receive the signed offline attestation certificate and store the signed offline attestation certificate in the first node application enclave 256 (arrow 324). Since the signed offline attestation certificate includes the remote attestation and the certificate information received from the certification server node 144, the certificate information can be retrieved from the first node application enclave 256 as needed to perform offline attestation verification.

Figure 4:
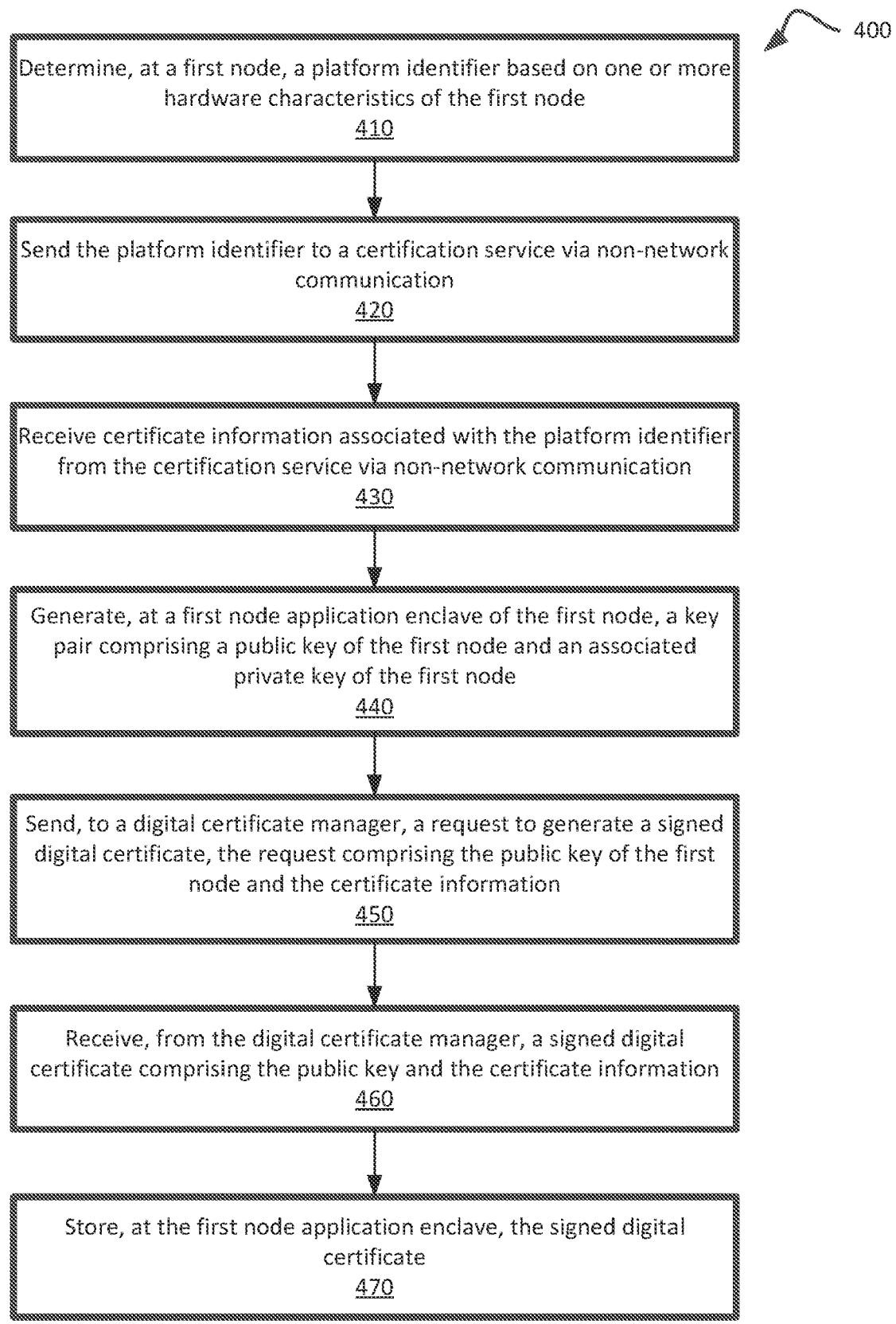
FIG. 4 is a flow diagram of an example method to obtain certificate information from a certification service across an air gap and store the certificate information at a node on a private network in accordance with particular embodiments of the present disclosure.

FIG. 4 is a flow diagram of an example method 400 to obtain certificate information from a certification service across an air gap and store the certificate information at a node on a private network in accordance with particular embodiments of the present disclosure. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 400 may be performed by the attestation manager 104 of FIG. 1.

As shown in FIG. 4, the method 400 may begin with processing logic determining, at a first node, a platform identifier based on one or more hardware characteristics of the first node (block 410). The hardware characteristics may include a serial number of the first node, for example. The processing logic may subsequently send the platform identifier to a certification service via non-network communication (block 420). The platform identifier is sent to the certification service across an air gap, and the certificate information is received from the certification service across the air gap.

The processing logic may further receive certificate information associated with the platform identifier from the certification service via non-network communication (block 430). The non-network communication may be removable storage media such as a flash drive, a magnetic disk drive, an optical drive, or other data storage device. The certificate information may include one or more certification key certificates and optional certificate revocation list(s) associated with the certificate(s). The digital certificate manager stores the certificate information in a database in association with the platform identifier, and the certificate information associated with the platform identifier can be identified in the database by searching the database for the platform identifier. The processing logic may further determine, at the first node, a certification key based on a shared secret accessible to the first node and accessible to the certification service.

The processing logic may further generate, at a first node application enclave of the first node, a key pair comprising a public key of the first node and an associated private key of the first node (block 440). The processing logic may further send, to a digital certificate manager 240, a request to generate a signed digital certificate, the request comprising the public key of the first node and the certificate information (block 450). The processing logic may further receive, from the digital certificate manager 240, a signed digital certificate comprising the public key and the certificate information (block 460).

The processing logic may further store, at the first node application enclave, the signed digital certificate (block 470). The processing logic may further receive, at the first node, a request from a second node to generate a remote attestation. The processing logic may further generate an enclave identity based on a cryptographic hash digest of contents of the first node application enclave. The cryptographic hash digest may be an SHA-1 hash value, for example. The processing logic may further generate a remote attestation signature by signing the hash digest using a signing key. The signing key may be the certification key.

The processing logic may further receive, at the first node, a request from a second node to generate a remote attestation, generate, at the first node application enclave, a local attestation based on a cryptographic hash of contents of the first node application enclave, generate a remote attestation by signing the local attestation using a signing key, and send the remote attestation to the second node.

The processing logic may further receive, at the first node, a request from a second node to generate an offline attestation certificate, generate, at the first node application enclave, a public key hash value based on a node public key of the first node, generate, at the first node application enclave, a local attestation based on a cryptographic hash of contents of the first node application enclave, the contents including the public key hash value, generate a remote attestation by signing the local attestation using a signing key, and send the remote attestation to the second node.

The processing logic may further generate, at a first node remote attestation enclave of the first node, an attestation key pair that includes an attestation public key and an associated attestation private key, and the signing key may be the attestation private key. The processing logic may further generate, at a first node remote attestation enclave of the first node, an attestation key certificate by signing the attestation public key using the certification key. The processing logic may further send the attestation key certificate to the digital certificate manager 240. The processing logic may further send, to the second node, a request to join a cluster of nodes that includes the second node, receive, from the second node, a master key. The processing logic may further encrypt or decrypt data stored at a storage resource using the master key. The processing logic may further generate the remote attestation such that the remote attestation includes the hash digest and the remote attestation signature. The processing logic may further send the remote attestation to the second node for verification.

Processing logic may receive, at the certification service, the platform identifier from the first node via non-network communication. The processing logic may further retrieve, from a certificate database, the certificate information associated with the platform identifier. The processing logic may further send, at the certification service, the certificate information associated with the platform identifier to the first node via non-network communication.

Figure 5:
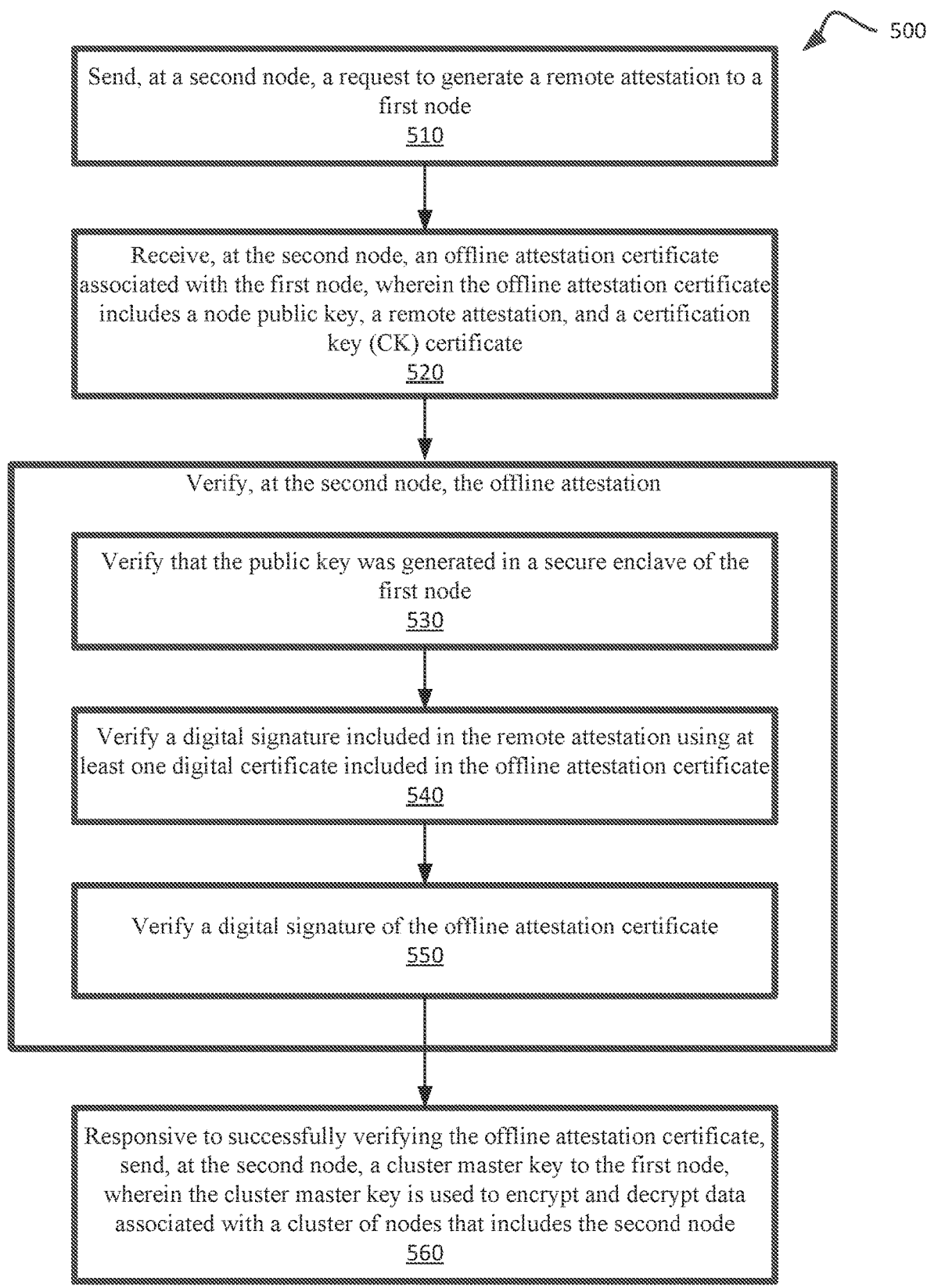
FIG. 5 is a flow diagram of an example method to verify the identity of a node by verifying a remote attestation of the node using offline attestation certificate information in accordance with particular embodiments of the present disclosure.

FIG. 5 is a flow diagram of an example method 500 to verify the identity of a node by verifying a remote attestation of the node using offline attestation certificate information in accordance with particular embodiments of the present disclosure. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 500 may be performed by the attestation verifier 132 of FIG. 1.

As shown in FIG. 5, the method 500 may begin with processing logic sending, at a second node, a request to generate a remote attestation to a first node (block 510). Sending the request to generate the remote attestation may be performed in response to receiving, at the second node, a request from the first node to join the cluster of nodes that includes the second node.

The processing logic may subsequently receive, at the second node, an offline attestation certificate associated with the first node, wherein the offline attestation certificate includes a node public key, a remote attestation, and a certification key (CK) certificate (block 520). The processing logic may further verify the offline attestation at the second node by performing blocks 530, 540, and 550. The processing logic may further verify that the public key was generated in a secure enclave of the first node (block 530). The processing logic may further verify that the public key was generated in a secure enclave of the first node by verifying that a cryptographic hash of the node public key is included in the remote attestation.

The processing logic may further verify a digital signature included in the remote attestation using at least one digital certificate included in the offline attestation certificate (block 540). Verifying a digital signature included in the remote attestation may be performed by verifying, using a certification key (CK) certificate included in the offline attestation certificate, a first signature included in the remote attestation, and verifying, using a hardware provider root certificate, a second signature included in the certification key (CK) certificate. Alternatively or additionally, verifying a digital signature included in the remote attestation may be performed by verifying, using an attestation key certificate included in the offline attestation certificate, a first signature included in the remote attestation, verifying, using a certification key (CK) certificate included in the offline attestation certificate, a second signature included in the attestation key certificate, and verifying, using a hardware provider root certificate, a third signature included in the certification key (CK) certificate.

The processing logic may further verify a digital signature of the offline attestation certificate (block 550). The processing logic may further send, from the second node, a cluster master key to the first node responsive to successfully verifying the offline attestation certificate. The cluster master key may be used to encrypt and decrypt data associated with a cluster of nodes that includes the second node.

Figure 6:
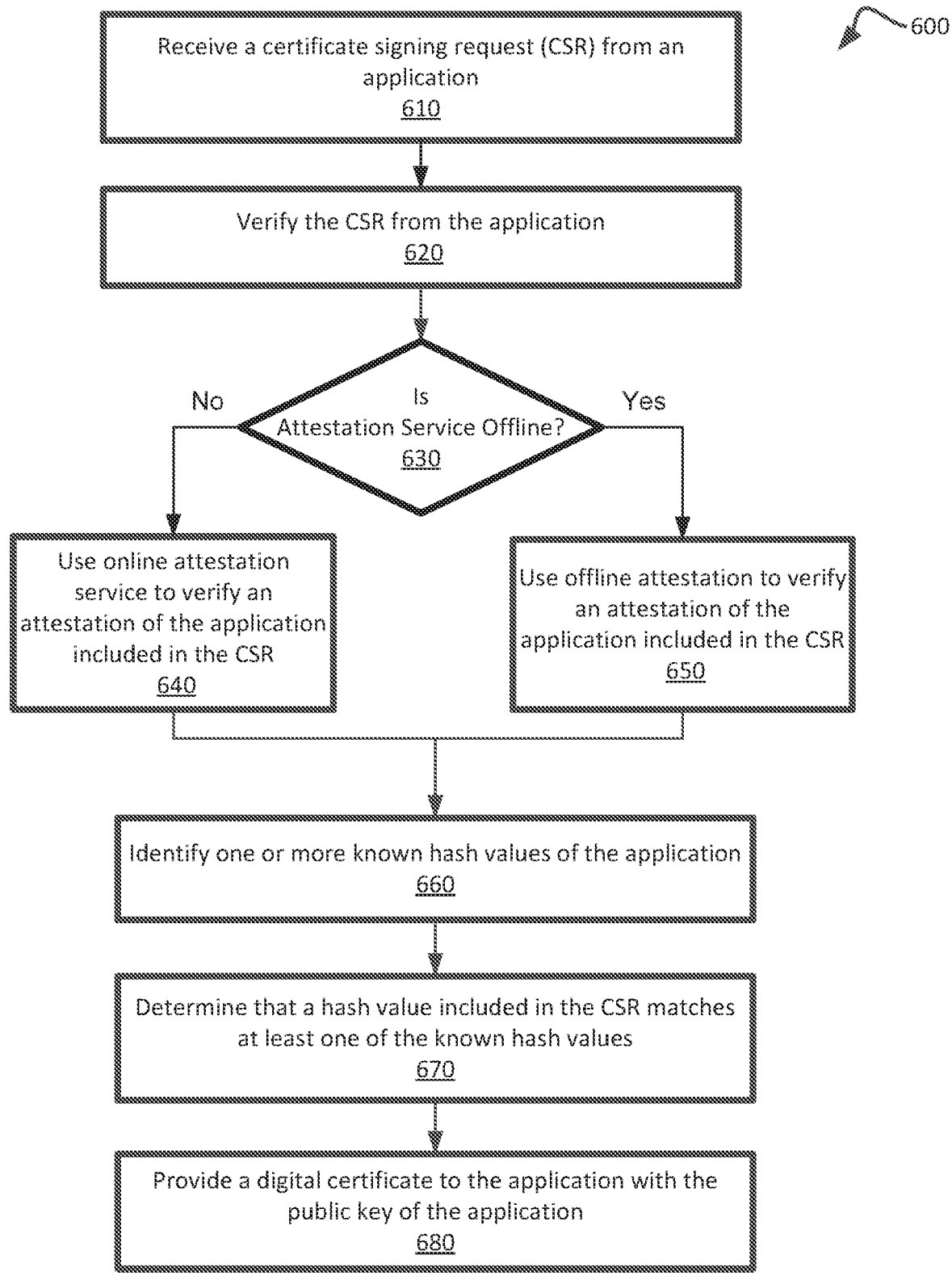
FIG. 6 is a flow diagram of an example method to verify a certificate signing request from an application to issue a digital certificate in accordance with some embodiments of the present disclosure.

FIG. 6 is a flow diagram of an example method 600 to verify a certificate signing request from an application to issue a digital certificate in accordance with some embodiments of the present disclosure. In general, the method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In particular embodiments, the method 600 may be performed, at least in part, by the attestation verifier 132 of FIG. 1.

As shown in FIG. 6, the method 600 may begin with processing logic receiving a certificate signing request (CSR) from an application (block 610). In some embodiments, the CSR may be received from a process or secure enclave that is executing the application. The processing logic may subsequently verify the CSR from the application (block 620). For example, the certificate signing request may be signed (e.g., include a digital signature) by a private key of the application and may also include the public key that corresponds to the private key. The digital signature of the certificate signing request may thus be verified by the public key that is included in the certificate signing request.

The processing logic may further determine whether the attestation service is offline (e.g., not reachable via a communication network) (block 630). If the attestation service is not offline, the processing logic may further use an online attestation service to verify an attestation of the application included in the CSR (block 640), and, if the attestation is successfully verified, continue to block 660. The processing logic may further use offline attestation to verify an attestation of the application included in the CSR (block 650), and, if the attestation is successfully verified, continue to block 660. Offline attestation may be performed as described herein, e.g., as described with reference to FIG. 1. The attestation may be verified after the digital signature of the certificate signing request has been verified. A digital certificate manager 240 may store known valid attestation values and may compare the attestation of the application included in the CSR with the known valid attestation values. In the same or alternative embodiments, the digital certificate manager may provide the received attestation value to another entity (e.g., another application, secure enclave, and/or network server) to determine whether the received attestation value is valid. The attestation value of the CSR may be valid when the attestation value matches a known valid attestation value. In the same or alternative embodiments, the attestation value of the CSR may be valid when the attestation value matches or is verified based on other information specified in the CSR. For example, the attestation value of the CSR may be valid when the attestation value is verified (and/or matches) based on the public key included in the CSR and/or the hash value of the application. If the attestation value of the CSR is determined to not be valid, then a digital certificate may not be issued. For example, an error message may be provided to the application that provided the CSR specifying that a digital certificate could not be issued as the attestation of the application was unsuccessful. In the same or alternative embodiments, an error message may be provided to the application when the CSR from the application is not verified.

The processing logic may further identify one or more known hash values of the application (block 660). For example, after the attestation value included in the CSR is verified and the CSR has been verified, the known hash values of the application (e.g., for each version of the application) may be identified.

The processing logic may further determine that a hash value included in the CSR matches at least one of the known hash values (block 670). For example, the hash value from the CSR may match another hash value previously provided to the digital certificate manager. In some embodiments, the processing logic may further determine that a network domain included in the certificate signing request matches a known network domain of the application that is stored at the digital certificate manager. The processing logic may further provide a digital certificate to the application (block 680). For example, the digital certificate may be issued to the application with a public key of the application. Further details about verifying a certificate signing request from an application, and the digital certificate manager, may be found in U.S. patent application Ser. No. 16/040,153, filed Jul. 19, 2018, which is incorporated herein by reference.

Figure 7:
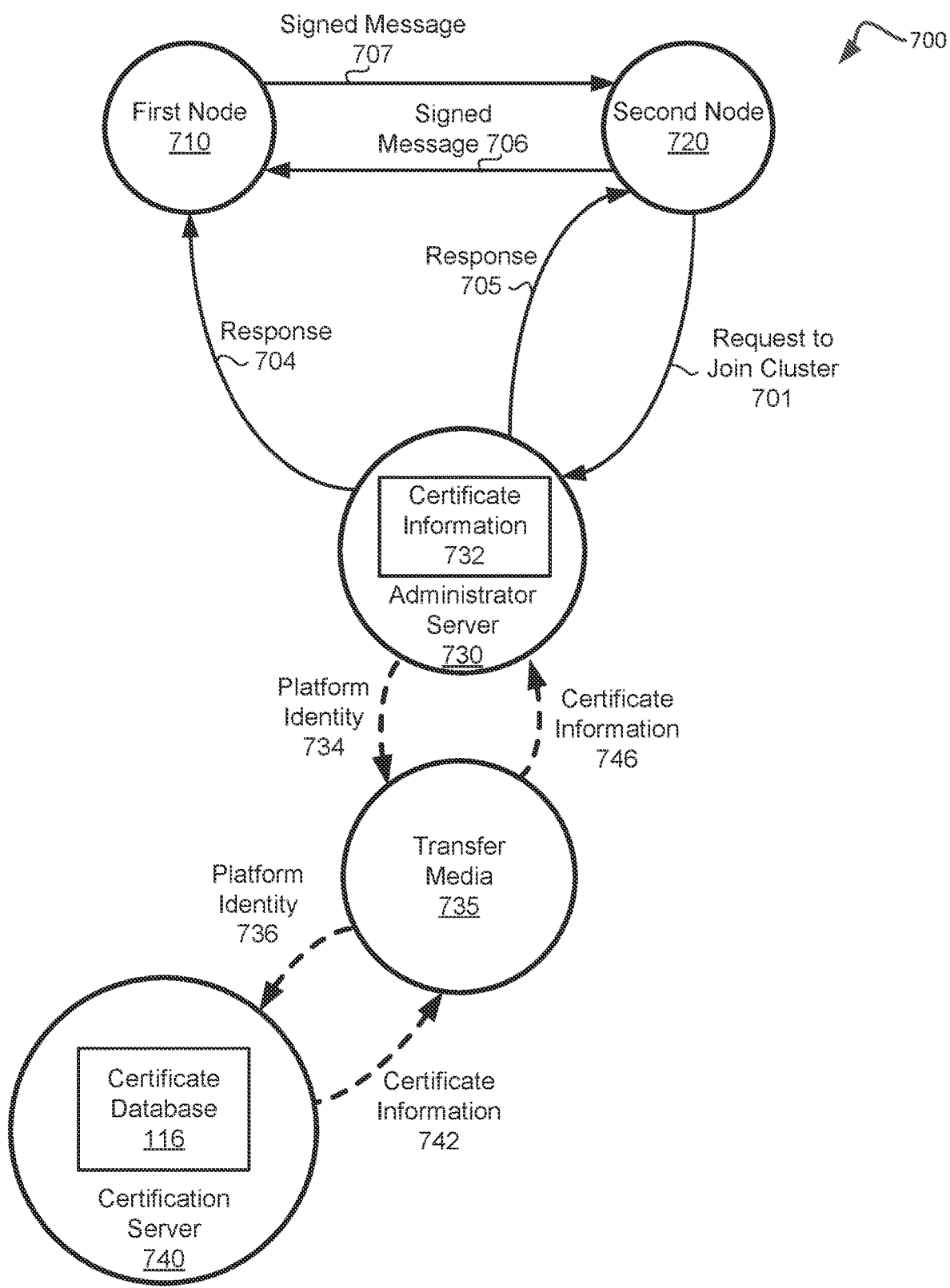
FIG. 7 illustrates an example environment to provide a master key from a first node to a second node of a secure cluster using offline attestation in accordance with some embodiments of the present disclosure.

FIG. 7 illustrates an example environment 700 to provide a master key from a first node to a second node of a secure cluster using offline attestation in accordance with some embodiments of the present disclosure. In general, the environment 700 may include a first node 710 and a second node 720 that may correspond to the node 110 and the node 120, respectively, of FIG. 1.

As shown in FIG. 7, the environment 700 may include a first node 710 and a second node 720. The first node 710 may include a master key. Each node in a network cluster corresponding to the environment 700 may include a copy of the master key to encrypt and/or decrypt data of a storage resource as previously described. The first node 710 may include a master key that is to be provided to the second node 720 in response to a successful authentication of the second node 720. The environment 700 may include an administrator server 730 (e.g., another network server) and a certification server 740. In some embodiments, the certification server 740 may correspond to certification server node 114, which may communicate with a hardware provider certification service 120. The service 120 may be, e.g., a server associated with an entity that provides or manufactured the processing device providing the first node 710.

In operation, the second node 720 may provide a request 701 to join a network cluster (e.g., a secure cluster of self-encrypting key management systems). For example, the request 701 may include attestation data of the second node 720. The attestation data may be based on an identification of a processor that is used to provide the second node 720. The request 701 may be received by an administrator server 730 (e.g., a server associated with the first node 710). The administrator server 730 may verify the attestation data using certificate information 732, which may include a certificate chain. The certificate chain may include a first certificate for a key used to sign the attestation data, and one or more other certificates that form a chain from the first certificate to a root certificate. For example, the certificate information 732 may include a certification key (CK) certificate containing a public key that can be used to verify the first certificate for the key used to sign the attestation data. The certificate information 732 may also include a root key certificate containing a public key that can be used to verify the certification key certificate. The root key certificate may be a trusted certificate that need not be verified, e.g., a certificate provided by a trusted HW provider certification service 120.

The administrator server 730 may receive the certificate information 732 from a certification server node 740 via transfer media 735, e.g., via a removable storage device such as a flash memory drive or card, that crosses an air gap between the administrator server 730 and certification server 740. The transfer media 735 may correspond to the transfer media 106, and the certification server node 740 may correspond to the certification server node 114 of FIG. 1, for example.

At shown by arrow 734, the administrator server 730 may copy or otherwise send a platform identity of the node for which an attestation is being verified, e.g., the second node 720, to the transfer media 735. The platform identity may be stored on the transfer media 735. The copy operation 734 may be performed while the transfer media 735 is physically interfaced with (e.g., plugged into, connected to, or otherwise communicating via a wired bus or interconnect). The transfer media 735 may be removed from the administrator server 730 and physically moved to a physical location of the certification server 740 and physically interfaced with the certification server 740. For example, the transfer media 735 may be inserted into an interface port or socket of the certification server. As shown by arrow 736, the platform identity may be copied or otherwise sent from the transfer media 735 to the certification server 740 while the transfer media 735 is physically interfaced with the certification server 740.

The administrator server 730 may use certificate information 732 to verify whether the attestation data from the second node 720 indicates that the second node 720 is provided by a valid processor provided or manufactured by an entity associated with the shared secret to which the certification key corresponds. If so, the administrator server 730 may provide a response 704 to the first node 710 to indicate that the first node 710 should register the second node 720 (e.g., that the second node should join the network cluster that includes the first node 710). For example, the administrator server 730 may provide a public key of the second node 720 to the first node 710. Furthermore, after the first node 710 receives the indication to register the second node 720, the administrator server 730 may provide a response 705 for the second node 720 to proceed with registering with the first node 710. For example, the second node 720 may provide a message 706 to the first node 710 where the message 706 is signed with the private key of the second node 720. The first node 710 may subsequently authenticate the message 706 from the second node 720 by using the previously received public key of the second node 720. After the first node 710 authenticates the message 706 from the second node 720, the first node 710 may provide a message 707 to the second node 720 where the message 707 includes a copy, or an encrypted copy, of the master key 711. In some embodiments, the message 707 may be signed by a private key of the first node 710 and verified by the second node 720 by using a known public key of the first node 710. As a result, the second node 720 may also use the copy of the master key 711 to encrypt and decrypt data at a storage resource that is also used by the first node 710.

The certification server 740 may retrieve certificate information associated with the platform identity from a certificate database 116 and copy or otherwise send the certificate information to the transfer media 735 as shown by arrow 742. The transfer media 735 may be removed from the certification server 740, physically moved to a physical location of the administrator server 730, and physically interfaced with the administrator server 730. As shown by arrow 746, the certificate information may be copied or otherwise sent from the transfer media 735 to the administrator server 730 and stored in a memory or other storage device of the administrator server 730 as certificate information 732. The certificate information may then be used to verify the attestation data as described above.

Figure 8:
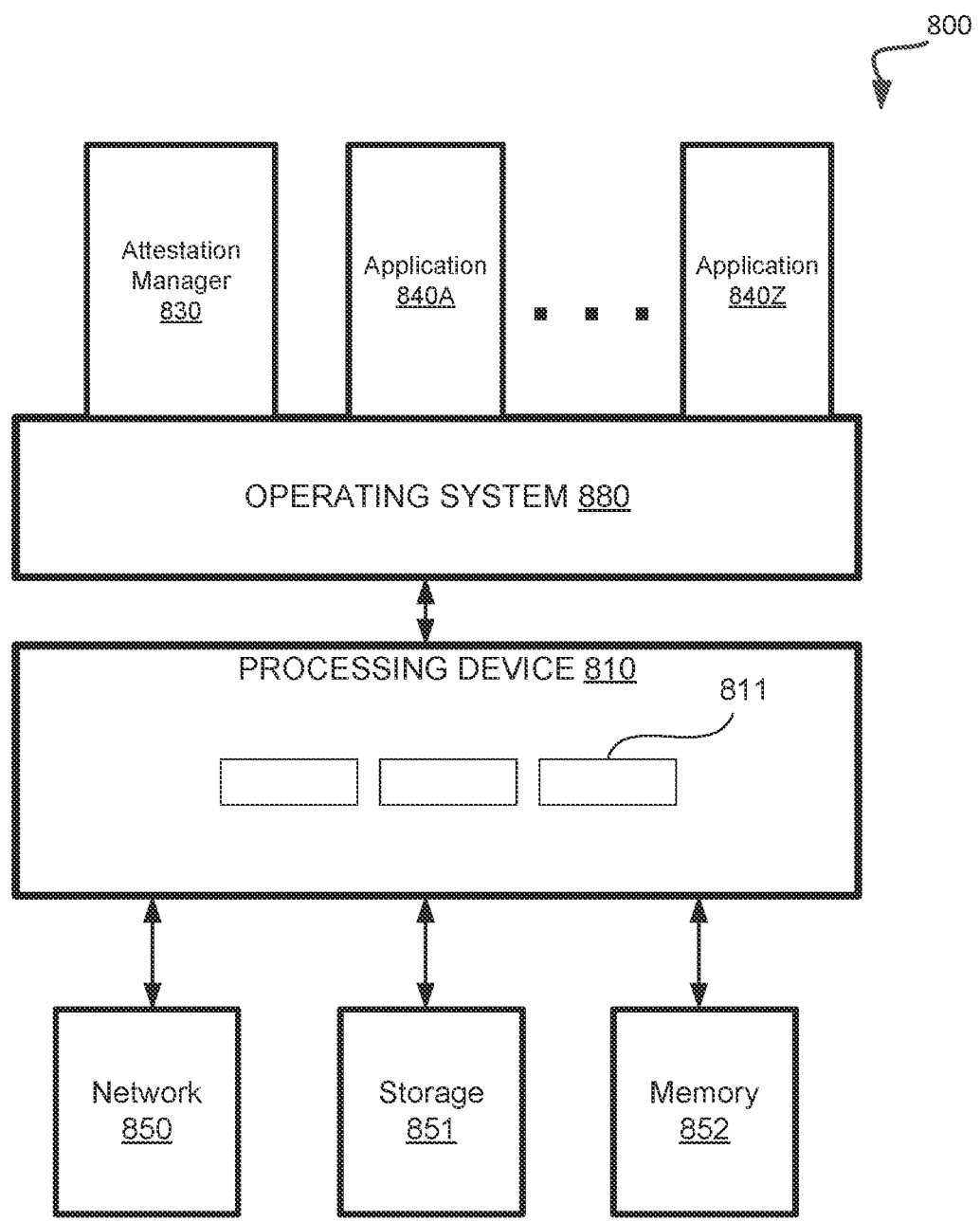
FIG. 8 illustrates an example network server with an attestation manager to execute an application in accordance with particular embodiments of the present disclosure.

FIG. 8 illustrates an example network server 800 with an attestation manager 830 to execute an application in accordance with particular embodiments of the present disclosure. In general, an attestation manager 830 may be hosted by a network server along with one or more other applications 840A to 840Z that are also hosted by the network server or another network server. The attestation manager 830 may be managed by the geo-fencing enclave manager 120 of FIG. 1.

As shown in FIG. 8, the network server 800 may include a processing device 810 that may execute an operating system 820. Furthermore, the processing device 810 may include one or more internal cryptographic keys 811 that may be used to encrypt and decrypt data stored in a portion of a memory that is assigned to a secure enclave of the attestation manager 830. As previously described, the access to the data of the attestation manager 830 in the secure enclave may be protected from the one or more applications 840A to 840Z and the operating system 820. For example, the access to the data of the secure enclave corresponding to the attestation manager 830 may be protected by the use of one of the internal cryptographic keys 811 that are internal to the processing device 810 so that the access to the data is based on a hardware access as opposed to a software access. The operating system 820 may be associated with a first privilege level and the attestation manager 830 and the applications 840A to 840Z may be associated with a second privilege level where the first privilege level of the operating system is more privileged than the second privilege level of the various applications that are run on the operating system 820 (e.g., the more privileged level allows access to more resources of the network server than the less privileged level). Thus, the operating system 820 may be allowed access to resources of the applications 840A to 840Z. However, since the attestation manager 830 is assigned to a secure enclave where access to the data of the secure enclave is based on the use of an internal cryptographic key 811 of the processing device 811, the operating system 820 may not be able to access the data of the attestation manager 830 despite having a more privileged level of access than the attestation manager 830.

In operation, the attestation manager 830 may be hosted on the network server 800. An attestation procedure may be performed to authenticate the attestation manager 830. After the attestation manager 830 has been authenticated, a connection may be considered to be established between the geo-fencing enclave manager and the attestation manager 830. Since the attestation manager 830 is assigned to a secure enclave, the data of the attestation manager 830 may be encrypted and protected by the use of an internal cryptographic key 811 (i.e., an internal key) of the processing device 810. In some embodiments, the attestation manager 830 may transmit identification information of the attestation manager 830 to the processing device 810 for the processing device 810 to execute an application within the secure cryptographic environment. The processing device 830 may use an instruction to use one of its internal cryptographic keys 811 that is based on the identification of the attestation manager 830 to store the data of the application in the memory of the secure enclave of the attestation manager 830. For example, the data may be securely (e.g., encrypted) stored in the storage 851 or memory 852 associated with the processing device 810 or at another storage resource over a network 850.

In some embodiments, the internal cryptographic key 811 may be combined with additional information (e.g., the identification information of the attestation manager 830) to generate a secure enclave key for the attestation manager 830 that is used to decrypt and/or encrypt data associated with the attestation manager 830. Thus, since the processing device 810 uses its internal cryptographic key 811 to decrypt data and to perform the operations of an application, the data of an application executed at the attestation manager may not be exposed external to the processing device 810.

Figure 9:
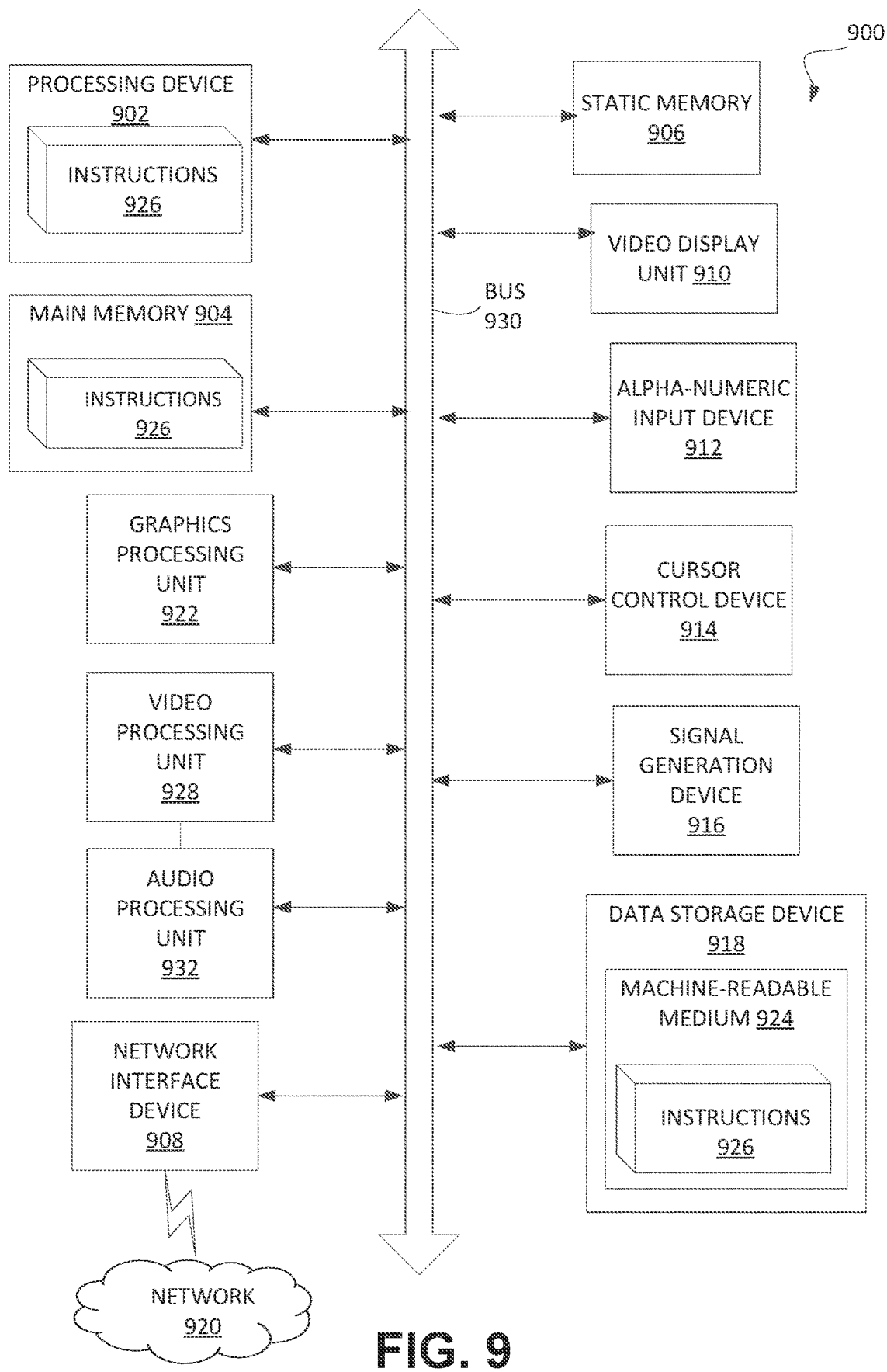
FIG. 9 illustrates an example computer system in which embodiments of the present disclosure operate.

FIG. 9 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to a geo-fencing enclave manager. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
    determining, at a first node, a platform identifier based on one or more hardware characteristics of the first node, wherein the first node is communicatively isolated from an insecure network comprising a cache node and a hardware provider node associated with a manufacturer of the first node;
    sending, via non-network communication with the cache node, the platform identifier to a certification service on the hardware provider node, wherein the cache node is to forward the platform identifier to the hardware provider node via the insecure network;
    receiving certificate information associated with the platform identifier from the certification service via the cache node and the non-network communication;
    generating, at a first node application enclave of the first node, a key pair comprising a public key of the first node and an associated private key of the first node;
    sending, to a digital certificate manager, a request to generate a signed digital certificate, the request comprising the public key of the first node and the certificate information;
    receiving, from the digital certificate manager, the signed digital certificate comprising the public key of the first node and the certificate information;
    storing, at the first node application enclave, the signed digital certificate;
    generating, at the first node application enclave, a local attestation based on a cryptographic hash of contents of the first node application enclave;
    generating a remote attestation by signing the local attestation using a signing key; and
    sending the remote attestation to a second node.

2. The method of claim 1, wherein the platform identifier is sent to the certification service across an air gap, and the certificate information is received from the certification service across the air gap.

3. The method of claim 1, wherein the certificate information comprises a certification key certificate, and the digital certificate manager stores the certificate information in a data store.

4. The method of claim 1, wherein the non-network communication comprises removable storage media.

5. The method of claim 1, further comprising:
    prior to generating the remote attestation, determining, at the first node, based on a shared secret accessible to the first node and accessible to the certification service, a certification key.

6. The method of claim 5,
    wherein the shared secret is embedded in a processor of the first node and stored at the certification service.

7. The method of claim 5, wherein the signing key comprises the certification key.

8. The method of claim 5, further comprising:
    generating, at a first node remote attestation enclave of the first node, an attestation key pair comprising an attestation public key and an associated attestation private key, wherein the signing key comprises the attestation private key;
    generating, at the first node remote attestation enclave of the first node, an attestation key certificate by signing the attestation public key using the certification key; and
    sending the attestation key certificate to the digital certificate manager.

9. The method of claim 1, further comprising:
    generating, at the first node application enclave, a public key hash value based on a node public key of the first node, wherein the cryptographic hash of contents of the first application enclave includes the public key hash value.

10. The method of claim 1, further comprising:
    sending, to the second node, a request to join a cluster of nodes that includes the second node;
    receiving, from the second node, a master key; and
    encrypting or decrypting, using the master key, data stored at a storage resource.

11. The method of claim 1, further comprising:
    receiving, at the certification service, the platform identifier from the first node via non-network communication;
    retrieving, from a certificate data store, the certificate information associated with the platform identifier; and sending, at the certification service, the certificate information associated with the platform identifier to the first node via the non-network communication.

12. A method comprising:
sending, at a second node, a request to generate a remote attestation to a first node, wherein the request to generate a remote attestation is sent in response to receiving, at the second node, a request from the first node to join a cluster of nodes that includes the second node, and wherein the first node and the second node are communicatively isolated from an insecure network comprising a cache node and a hardware provider node associated with a manufacturer of the first node;
receiving, at the second node, an offline attestation certificate associated with the first node, wherein the offline attestation certificate includes a node public key, a remote attestation, and a certification key (CK) certificate provided to the first node by the cache node;
verifying, at the second node, the offline attestation certificate by:
  verifying that the node public key was generated in a secure enclave of the first node;
  verifying, using an attestation key certificate included in the offline attestation certificate, a first signature included in the remote attestation;
  verifying, using a certification key (CK) certificate included in the offline attestation certificate, a second signature included in the attestation key certificate; and
  verifying, using a hardware provider root certificate associated with the hardware provider node, a third signature included in the certification key (CK) certificate; and
responsive to successfully verifying the offline attestation certificate, sending, at the second node, a cluster master key to the first node, wherein the cluster master key is used to encrypt and decrypt data associated with the cluster of nodes that includes the second node.

13. The method of claim 12, wherein verifying, at the second node, that the node public key was generated in a secure enclave of the first node comprises verifying that a cryptographic hash of the node public key is included in the remote attestation.

14. The method of claim 12, wherein the offline attestation certificate comprises certificate information originating from the hardware provider node on the insecure network.

15. The method of claim 12, wherein verifying a digital signature included in the remote attestation comprises:
verifying, using a certification key (CK) certificate included in the offline attestation certificate, a first signature included in the remote attestation; and
verifying, using a hardware provider root certificate, a second signature included in the certification key (CK) certificate.

16. A system comprising:
a memory; and
a processing device communicably coupled to the memory, the processing device to perform operations comprising:
  determining, at a first node, a platform identifier based on one or more hardware characteristics of the first node, wherein the first node is communicatively isolated from an insecure network comprising a cache node and a hardware provider node associated with a manufacturer of the first node;
  sending, via non-network communication with the cache node, the platform identifier to a certification service on the hardware provider node, wherein the cache node is to forward the platform identifier to the hardware provider node via the insecure network;
  receiving certificate information associated with the platform identifier from the certification service via the cache node and the non-network communication;
  generating, at a first node application enclave of the first node, a key pair comprising a public key of the first node and an associated private key of the first node;
  sending, to a digital certificate manager, a request to generate a signed digital certificate, the request comprising the public key of the first node and the certificate information;
  receiving, from the digital certificate manager, a signed digital certificate comprising the public key of the first node and the certificate information;
  storing, at the first node application enclave, the signed digital certificate;
  generating, at the first node application enclave, a local attestation based on a cryptographic hash of contents of the first node application enclave;
  generating a remote attestation by signing the local attestation using a signing key; and
  sending the remote attestation to a second node.

17. The system of claim 16, wherein the platform identifier is sent to the certification service across an air gap, and the certificate information is received from the certification service across the air gap.

18. The system of claim 16, wherein the certificate information comprises a certification key certificate, and the digital certificate manager stores the certificate information in a data store.

19. The system of claim 16, wherein the non-network communication comprises removable storage media.

20. A computer-readable medium comprising instructions which when executed by a processing device cause the processing device to perform operations comprising:
determining, at a first node, a platform identifier based on one or more hardware characteristics of the first node, wherein the first node is communicatively isolated from an insecure network comprising a cache node and a hardware provider node associated with a manufacturer of the first node;
sending, via non-network communication with the cache node, the platform identifier to a certification service on the hardware provider node, wherein the cache node is to forward the platform identifier to the hardware provider node via the insecure network;
receiving certificate information associated with the platform identifier from the certification service via the cache node and the non-network communication;
generating, at a first node application enclave of the first node, a key pair comprising a public key of the first node and an associated private key of the first node;
sending, to a digital certificate manager, a request to generate a signed digital certificate, the request comprising the public key of the first node and the certificate information;
receiving, from the digital certificate manager, a signed digital certificate comprising the public key of the first node and the certificate information;
storing, at the first node application enclave, the signed digital certificate;
generating, at the first node application enclave, a local attestation based on a cryptographic hash of contents of the first node application enclave;

generating a remote attestation by signing the local attestation using a signing key; and
sending the remote attestation to a second node.

\* \* \* \* \*